United States Patent
Yamakami et al.

(10) Patent No.: US 8,500,265 B2
(45) Date of Patent: Aug. 6, 2013

(54) INK JET INK, INK SET, INK JET RECORDING METHOD, INK CARTRIDGE, RECORDING UNIT AND INK JET RECORDING APPARATUS

(75) Inventors: Hideki Yamakami, Kawasaki (JP); Daiji Okamura, Tokyo (JP); Hiroshi Tomioka, Tokyo (JP); Chiaki Muraoka, Kawaguchi (JP); Masaki Oikawa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 12/424,499

(22) Filed: Apr. 15, 2009

(65) Prior Publication Data

US 2009/0274840 A1 Nov. 5, 2009

(30) Foreign Application Priority Data

Apr. 30, 2008 (JP) .................. 2008-118335

(51) Int. Cl.
*B41J 2/01* (2006.01)
(52) U.S. Cl.
USPC ............ 347/100; 347/95; 347/101; 347/54
(58) Field of Classification Search
USPC ............. 347/100, 102, 103, 104, 105, 101, 347/44, 45, 47, 61, 65, 40, 54, 84, 85; 523/160, 523/161
See application file for complete search history.

(56) References Cited

U.S. PATENT DOCUMENTS

| | | | |
|---|---|---|---|
| 6,460,976 B1 | 10/2002 | Oikawa | 347/57 |
| 6,959,979 B2 * | 11/2005 | Goin et al. | 347/65 |
| 7,510,604 B2 | 3/2009 | Negishi et al. | 106/31.47 |
| 7,520,927 B2 | 4/2009 | Yamakami et al. | 106/31.47 |
| 7,578,585 B2 | 8/2009 | Yamakami et al. | 347/100 |
| 2004/0218007 A1 * | 11/2004 | Tomizawa et al. | 347/40 |
| 2004/0227786 A1 | 11/2004 | Muraoka | 347/40 |
| 2005/0115459 A1 * | 6/2005 | Hanmura et al. | 347/100 |
| 2005/0137283 A1 * | 6/2005 | Frese et al. | 523/160 |
| 2006/0232637 A1 * | 10/2006 | Matsui et al. | 347/65 |
| 2006/0268058 A1 * | 11/2006 | Muraoka | 347/40 |
| 2007/0109371 A1 | 5/2007 | Tomioka et al. | 347/86 |
| 2008/0074467 A1 * | 3/2008 | Muraoka | 347/47 |
| 2009/0147056 A1 * | 6/2009 | Oikawa et al. | 347/61 |
| 2009/0285988 A1 * | 11/2009 | Matsumoto et al. | 106/31.47 |

FOREIGN PATENT DOCUMENTS

| | | |
|---|---|---|
| JP | 8-120204 | 5/1996 |
| JP | 2006-315395 | 11/2006 |

OTHER PUBLICATIONS

MEGlobal Ethylene Glycol Product Guide (c) 2008 THe MEGlobal Groups of Companies (p. 1-33).*

* cited by examiner

*Primary Examiner* — Manish S Shah
(74) *Attorney, Agent, or Firm* — Fitzpatrick, Cella, Harper & Scinto

(57) ABSTRACT

An ink to be applied to a recording head having a common liquid chamber, pressure chambers developing pressure applied to the liquid, individual channels through which the liquid is introduced into the pressure chambers from the common liquid chamber, and a group of nozzles which communicate with the pressure chambers and eject the liquid, where first nozzles having short individual channels and second nozzles having long ones are alternately arranged at arrangement intervals of less than 30 μm along one side or sides of the common liquid chamber, contains an aqueous medium, a surfactant and a coloring material. The aqueous medium consists of water and a water-soluble organic compound containing at least one alkanediol and has a surface tension of from 40 mN/m or more to less than 60 mN/m in an environment of temperature 25° C. and humidity 50%.

15 Claims, 12 Drawing Sheets

PRIMARY SCANNING DIRECTION

PRIMARY SCANNING DIRECTION

PRIMARY SCANNING DIRECTION

PRIMARY SCANNING DIRECTION

PRIMARY SCANNING DIRECTION

LARGE DOTS

SMALL DOTS

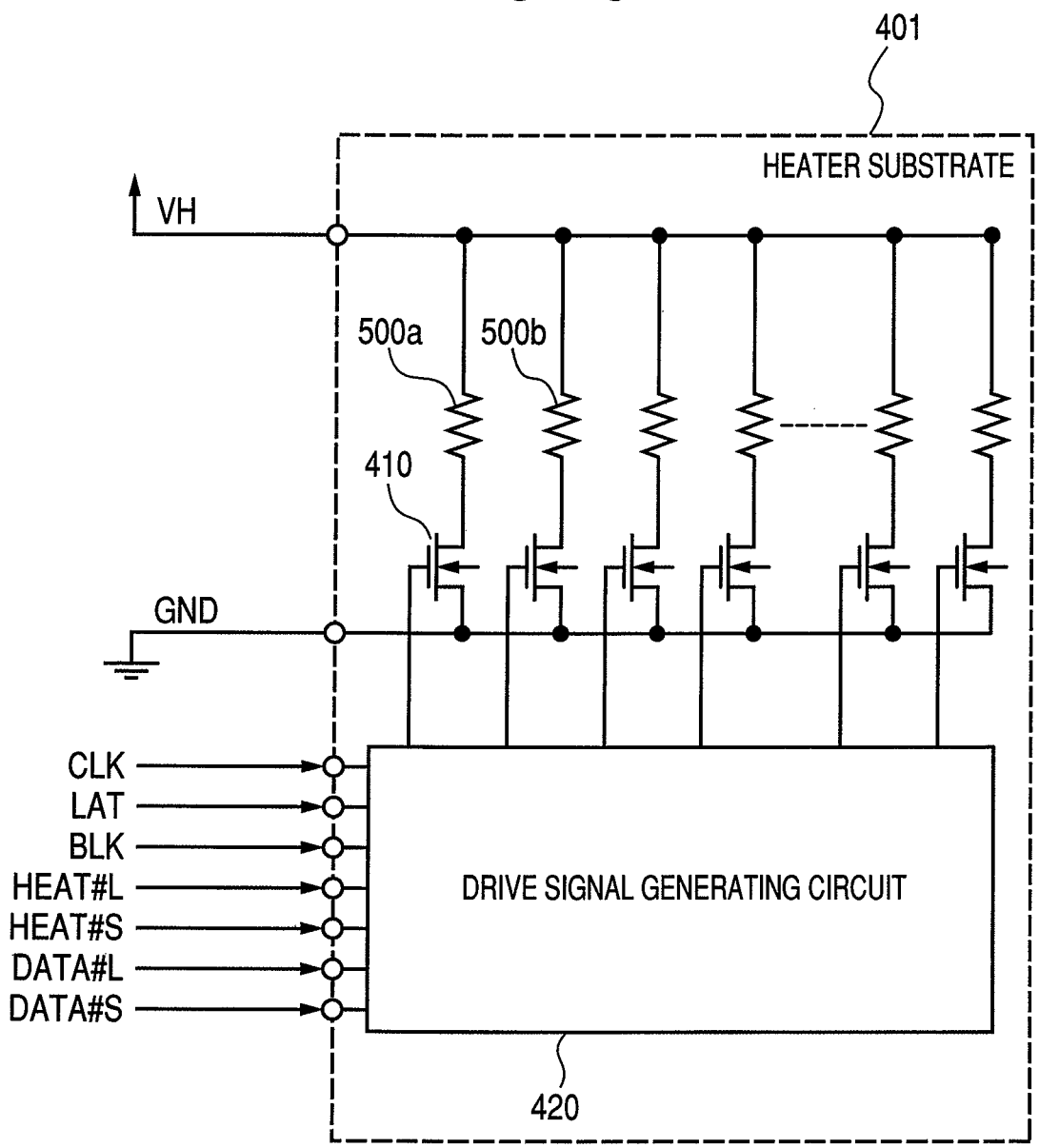

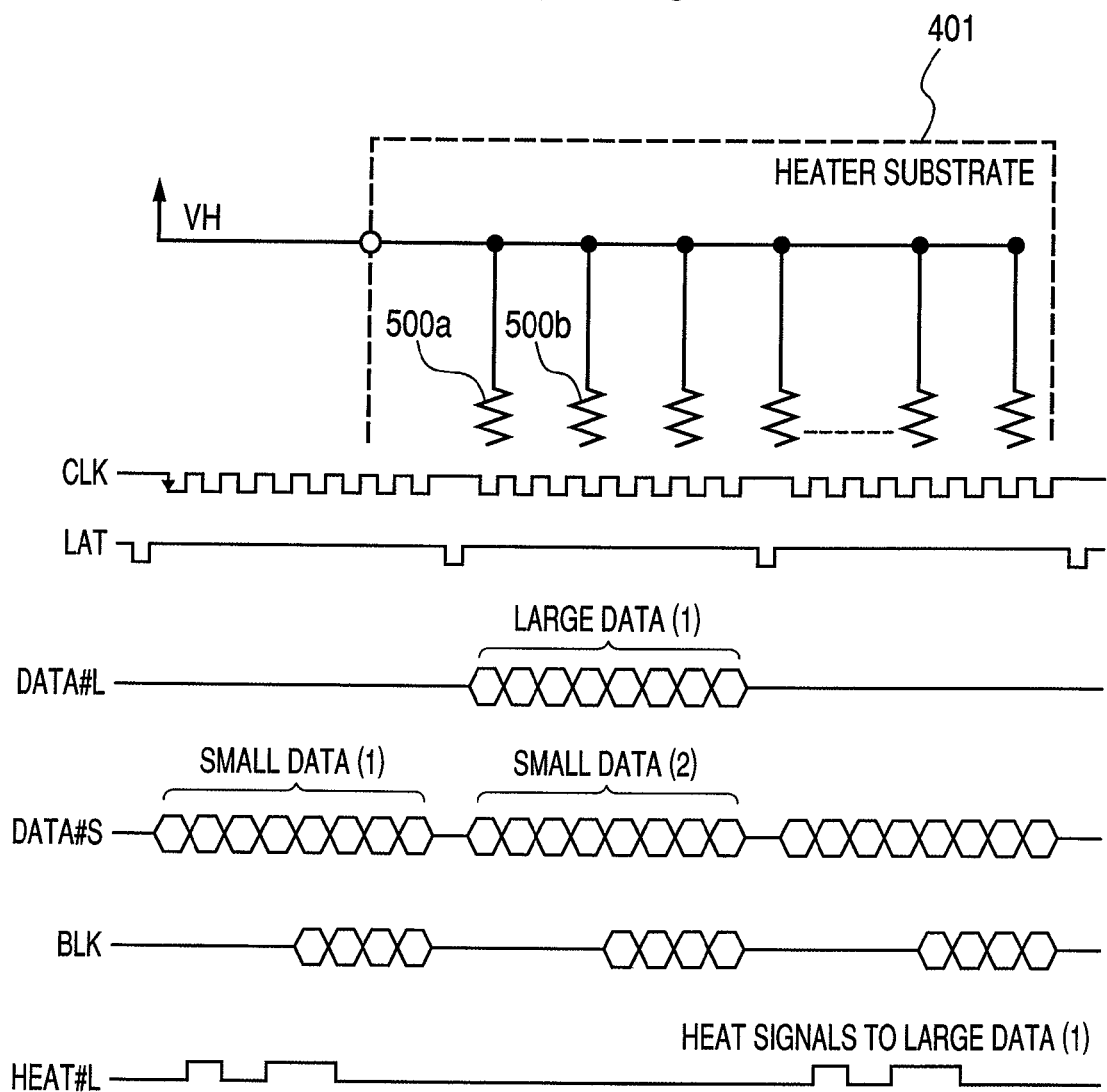

PRIMARY SCANNING DIRECTION

INK JET INK, INK SET, INK JET RECORDING METHOD, INK CARTRIDGE, RECORDING UNIT AND INK JET RECORDING APPARATUS

BACKGROUND OF THE INVENTION

1. Field of the Invention

This invention relates to an ink jet ink, an ink set, an ink jet recording method, an ink cartridge, a recording unit and an ink jet recording apparatus.

2. Description of the Related Art

The ink jet recording method is a recording process in which ink droplets are applied to recording mediums such as plain paper and glossy mediums to form images thereon, and is rapidly coming into wide use because of its contribution to low price and achievement of improvement in recording speed. As images thereby obtainable have made progress toward higher image quality and in addition thereto digital cameras have rapidly come into wide use, the ink jet recording method has also become widely popular as a process for reproducing images that is comparable to silver salt photography.

In recent years, in such an ink jet recording method, it is required on the one hand to achieve much higher image quality than ever on the images thereby obtainable, and on the other hand it is further required to simultaneously achieve improvement in recording speed. As a method by which ink jet recorded images can be made higher in image quality, it is proposed that first nozzles and second nozzles both having ink channels different in length from each other are arranged in a staggered manner so as to achieve both good refill performance and high-density nozzle arrangement (see Japanese Patent Application Laid-open No. 2006-315395). Herein, the refill performance refers to what may be presented by such a method as given below. For example, it may be presented by the time interval that extends after ink has been ejected and until a meniscus of the ink, which has receded into a nozzle as a result of ejection, returns to a proper position in the vicinity of an ejection orifice to come to enable the next ejection of ink to be properly performed (i.e., refill period).

Meanwhile, in the ink jet recording method, it has come to be highly required to improve image quality of the images to be formed on recording mediums, in particular, on plain paper. Stated specifically, it is sought to improve the uniformity in color of the images to be formed on plain paper.

Further, in order that the ink droplets to be ejected from an ink jet recording head can be made into smaller droplets, the performance required for the ink jet ink has become higher, where the ink is required to have severer properties in respect of ink reliability such as anti-clogging and ejection stability. As an example thereof, the ink is required to be improved in its intermittent-ejection stability. In order to improve both the intermittent-ejection stability and the image quality on plain paper, a proposal is made on an ink jet ink which contains a surfactant having a specific structure and contains urea (see Japanese Patent Application Laid-open No. H08-120204).

About such various problems as above in the ink jet recording method, in order to achieve both the intermittent-ejection stability of ink and the image quality on plain paper while making achievement of high-speed recording and high image quality by making the refill period shorter, the present inventors have made studies on the following. First, they have attempted to perform ink jet recording by using a recording head in which, in addition to the constitution disclosed in Japanese Patent Application Laid-open No. 2006-315395, nozzles having relatively short individual channels and nozzles having relatively long individual channels are alternately arranged at intervals of less than 30 μm, and by using the ink disclosed in Japanese Patent Application Laid-open No. H08-120204. As the result, the present inventors have found that the following new problem comes about when constituted as described above.

That is, as a first problem, it has turned out that a droplet of ink having been ejected comes divided into an ink droplet which is largest in volume (a primary droplet) and a plurality of ink droplets which are relatively small in volume (satellite droplets) and further the satellite droplets impact on a recording medium off the course to cause positional deviation of satellite droplet impact conspicuously. In such a case, the satellite droplets having formed impact on the recording medium in the state they deviate in the direction perpendicular to the direction of primary scanning of the recording head, and hence the images obtained comes greatly low in image quality. Incidentally, such a phenomenon of the positional deviation of satellite droplet impact is not concerned with the speed of movement of the recording head.

Besides the foregoing, the present inventors have also found that the following second problem comes about additionally. That is, where the recording head set up as described above is used, in the nozzles having relatively short individual channels the speed of ejection of the ink ejected differs greatly for each of the ejection made a plurality of times, so that the position of droplet impact of the ink may greatly deviate. Such a problem may come about. In such a case, the ink droplets impact on the recording medium in the state they deviate in the direction parallel to the direction of primary scanning of the recording head. Hence, the more the recording speed is improved (i.e., the higher it is), the more greatly the image quality comes low.

The present inventors have further found that, where the nozzle arrangement of the recording head is made high-density by the method disclosed in Japanese Patent Application Laid-open No. 2006-315395, the area of contact between nozzle materials and a lower-part base member comes relatively small, and this makes the nozzle materials tend to come off, resulting in a great lowering in durability of the recording head.

As discussed above, the studies made by the present inventors have revealed that an attempt to achieve a higher image quality of ink jet recorded images and an improvement in recording speed by changing the construction of the recording head brings about the new problems as stated above. More specifically, the new problems come about such as the positional deviation of satellite droplet impact, the positional deviation of ink droplet impact that is due to changes in ink ejection speed and also the lowering in durability of the recording head. Then, it has come to light that such problems are the cause that makes it more difficult to all well achieve both the higher image quality of ink jet recorded images and the enhancement of recording speed and achieve the uniformity in color on plain paper, as especially strongly required to do so in recent years.

SUMMARY OF THE INVENTION

Accordingly, a first object of the present invention is to provide the following ink jet ink. That is, it is to provide an ink jet ink which, when applied to a specific recording head achievable of higher image quality of ink jet recorded images and improvement of recording speed, promises a superior uniformity in color on plain paper, may less cause the positional deviation of satellite droplet impact and also may not damage the durability of the recording head.

A second object of the present invention is to provide an ink jet ink which can accomplish the above performance and in addition thereto may further less cause the positional deviation of ink droplet impact that is due to changes in ink ejection speed.

Still another object of the present invention is to provide an ink set, an ink jet recording method, an ink cartridge, a recording unit and an ink jet recording apparatus which make use of the above ink jet ink.

The above first object is achieved by the present invention summarized below. That is, the present invention is an ink jet ink which is to be applied to a recording head comprising a common liquid chamber from which a liquid is to be fed, a plurality of pressure chambers which develop pressure applied to the liquid, a plurality of individual channels through which the liquid is introduced respectively into the plurality of pressure chambers from the common liquid chamber, and a group of nozzles which communicate respectively with the pressure chambers in order to eject the liquid therefrom; and the group of nozzles being constituted of first nozzles having relatively short individual channels and second nozzles having relatively long individual channels, which first nozzles and second nozzles are alternately arranged at arrangement intervals of less than 30 µm along one side, or a plurality of sides, of the common liquid chamber; the ink containing at least an aqueous medium, a surfactant and a coloring material, the aqueous medium consisting essentially of water and at least one water-soluble organic compound containing at least one alkanediol, and the aqueous medium having a surface tension of from 40 mN/m or more to less than 60 mN/m in an environment of a temperature of 25° C. and a humidity of 50%.

The above second object is also achieved by the following another embodiment of the present invention. That is, the present invention is the ink jet ink which is constituted as described above, wherein the aqueous medium has a surface tension of from 50 mN/m or more to less than 60 mN/m in an environment of a temperature of 25° C. and a humidity of 50%.

The above still another object is also achieved by the following still another embodiment of the present invention. That is, the present invention is an ink set constituted of a plurality of inks; the ink jet ink which is constituted as described above being used as any one of the inks constituting the ink set.

The above still another object is also achieved by the following still another embodiment of the present invention. That is, the present invention is an ink jet recording method which performs recording by ejecting an ink by an ink jet system from a recording head comprising a common liquid chamber from which a liquid is to be fed, a plurality of pressure chambers which develop pressure applied to the liquid, a plurality of individual channels through which the liquid is introduced respectively into the plurality of pressure chambers from the common liquid chamber, and a group of nozzles which communicate respectively with the pressure chambers in order to eject the liquid therefrom; the group of nozzles being constituted of first nozzles having relatively short individual channels and second nozzles having relatively long individual channels, which first nozzles and second nozzles are alternately arranged at arrangement intervals of less than 30 µm along one side, or a plurality of sides, of the common liquid chamber; the ink comprising the ink jet ink which is constituted as described above.

The above still another object is also achieved by the following still another embodiment of the present invention. That is, the present invention is an ink cartridge having an ink storage portion storing an ink therein; the ink comprising the ink jet ink which is constituted as described above.

The above still another object is also achieved by the following still another embodiment of the present invention. That is, the present invention is a recording unit having i) an ink storage portion storing an ink therein and ii) a recording head for ejecting the ink therefrom, comprising a common liquid chamber from which a liquid is to be fed, a plurality of pressure chambers which develop pressure applied to the liquid, a plurality of individual channels through which the liquid is introduced respectively into the plurality of pressure chambers from the common liquid chamber, and a group of nozzles which communicate respectively with the pressure chambers in order to eject the liquid therefrom; the group of nozzles being constituted of first nozzles having relatively short individual channels and second nozzles having relatively long individual channels, which first nozzles and second nozzles are alternately arranged at arrangement intervals of less than 30 µm along one side, or a plurality of sides, of the common liquid chamber; the ink comprising the ink jet ink which is constituted as described above.

The above still another object is also achieved by the following still another embodiment of the present invention. That is, the present invention is an ink jet recording apparatus having i) an ink storage portion storing an ink therein and ii) a recording head for ejecting the ink therefrom, comprising a common liquid chamber from which a liquid is to be fed, a plurality of pressure chambers which develop pressure applied to the liquid, a plurality of individual channels through which the liquid is introduced respectively into the plurality of pressure chambers from the common liquid chamber, and a group of nozzles which communicate respectively with the pressure chambers in order to eject the liquid therefrom; the group of nozzles being constituted of first nozzles having relatively short individual channels and second nozzles having relatively long individual channels, which first nozzles and second nozzles are alternately arranged at arrangement intervals of less than 30 µm along one side, or a plurality of sides, of the common liquid chamber; the ink comprising the ink jet ink which is constituted as described above.

According to the present invention, it can provide the following ink jet ink, having superior performance.

It can provide an ink jet ink which, when applied to a specific recording head achievable of higher image quality of ink jet recorded images and improvement of recording speed, promises a superior uniformity in color on plain paper, may less cause the positional deviation of satellite droplet impact and also makes the recording head have a superior durability. According to a second embodiment of the present invention, it can provide an ink jet ink which can accomplish the above performance and in addition thereto may further less cause the positional deviation of ink droplet impact that is due to changes in ink ejection speed.

According to another embodiment of the present invention, making use of the above ink jet ink, it can provide an ink set, an ink jet recording method, an ink cartridge, a recording unit and an ink jet recording apparatus which are able to obtain high-grade images stably.

Further features of the present invention will become apparent from the following description of exemplary embodiments with reference to the attached drawings.

BRIEF DESCRIPTION OF THE DRAWINGS

FIG. 9 is a diagrammatic view showing an example of constitution of a drive circuit for a recording head.

FIG. 10 is an illustration showing an example of input signals sent for a recording head from a recording control unit of a recording apparatus main body.

DESCRIPTION OF THE EMBODIMENTS

Figure 1:
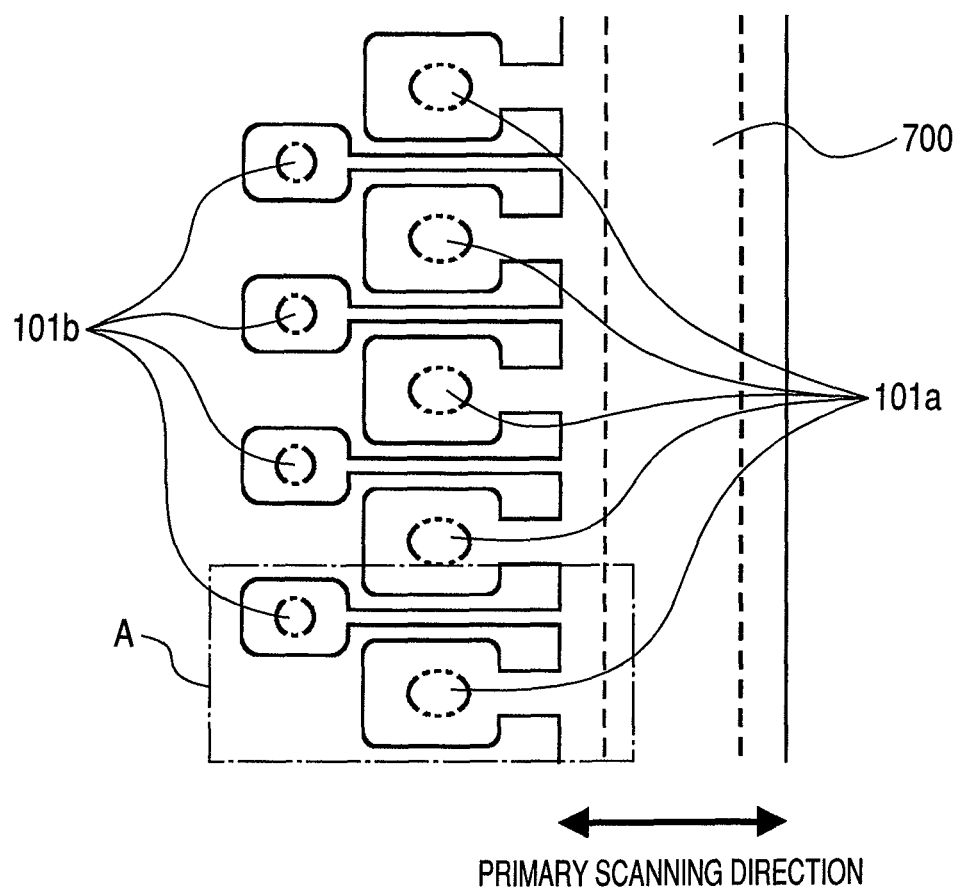
FIG. 1 is a diagrammatic view showing a group of nozzles of a recording head in the state its nozzle plate is removed.

The present invention is described below in detail by giving preferred embodiments. In the present invention, where a compound is a salt, the salt is present in the ink in the state it has dissociated into ions, but, for convenience, it is expressed as "contain(s) a salt". What refers to a compound represented by General Formula (I) is often simply termed "compound of General Formula (I).

<Recording Head>

First, a recording head to which the ink jet ink (hereinafter often called "ink") of the present invention is to be applied is described in detail.

In recent years, it is sought in the ink jet recording method, in particular, to make ink-jet recorded images (hereinafter often called "images") have a higher image quality and to improve recording speed (i.e., make higher in speed).

First, as a means by which the higher image quality can be achieved for images, it may be given (1) to make nozzles smaller in size and (2) to make nozzles higher in density. To make nozzles smaller in size enables more high-definition recording, and to alternately arrange a plurality of nozzles different in length from one another at fine arrangement intervals also enables more high-definition recording.

Second, as a means by which the improvement in recording speed can be achieved, it may mainly be given (3) to use a recording head having an ink channel structure that can make the ink refill period shorter. In order to improve the recording speed, it is necessary for the recording head to be driven at a high speed. In order to deal with it, it is necessary for ink droplets to be ejected in a large quantity per unit time. To that end, it is necessary not only to make the nozzles higher in density but also to use the recording head having an ink channel structure that can make the refill period shorter. In order to make the refill period shorter, a means is available in which, e.g., individual channels communicating with a common liquid chamber are made shorter for the purpose of making flow resistance lower.

Then, in order to achieve both the higher image quality for recorded images and the improvement in recording speed, it is preferable that first nozzles having relatively short individual channels and second nozzles having relatively long individual channels are alternately arranged at arrangement intervals of less than 30 μm along one side of the common liquid chamber.

In order to improve the recording speed further, it is also preferable that the level of ejection from the first nozzles having relatively short individual channels is set relatively large compared with the level of ejection from the second nozzles having relatively long individual channels. The nozzles having relatively short individual channels have a low flow resistance as mentioned above, and hence such nozzles are advantageous in view of the refill performance. Accordingly, the level of ejection from such first nozzles may be set relatively large, and this enables the ink droplets to be ejected in a large quantity per unit time, thus further improvement in recording speed can be achieved.

Figure 3:
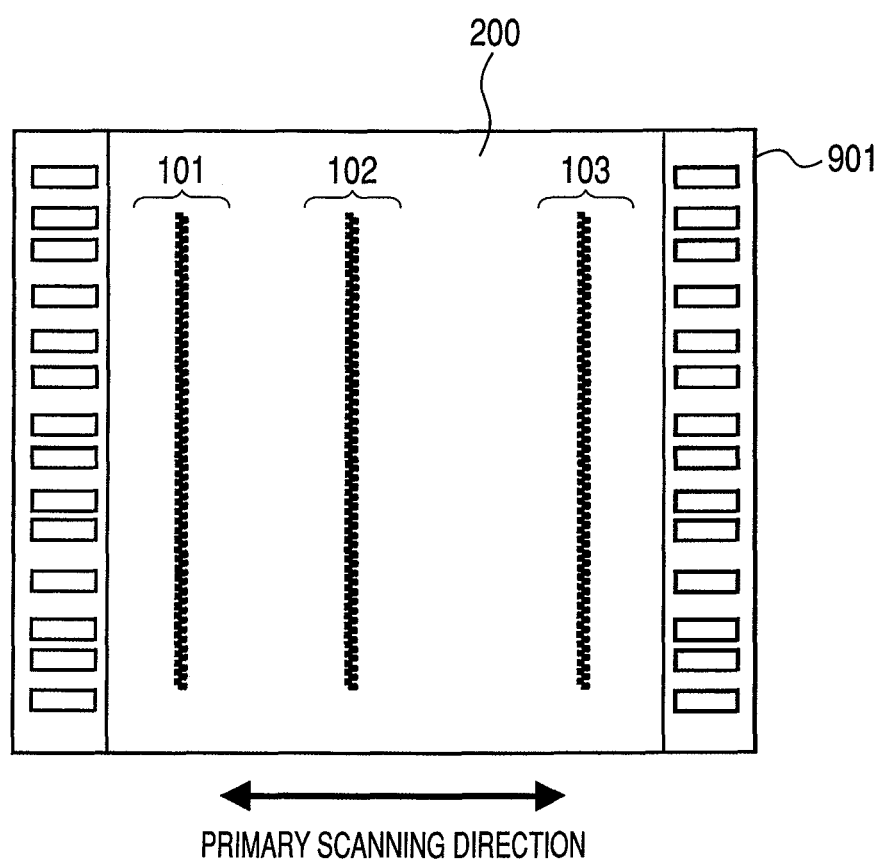
FIG. 3 is a diagrammatic view of a recording head as viewed from the direction opposite to its ejection face.

Recording Head of First Embodiment:

An example of nozzle arrangement in a recording head having specific set-up and to which the ink of the present invention is to be applied is described below. FIG. 3 is a diagrammatic view of a recording head 901 for ink jet recording according to a first embodiment and to which the ink of the present invention is to be applied, as viewed from the direction opposite to its face having ejection orifices (hereinafter often called "ejection face". This recording head 901 is one used in what is called a serial type ink jet recording apparatus, which ejects therefrom ink droplets of two kinds in volume.

In each of three columns of nozzle groups 101 to 103 provided on a nozzle plate 200, two types of nozzles are arranged which eject therefrom ink droplets different in volume from each other for each type of the nozzles. The nozzle groups 101 to 103 may be so set up that inks ejected therefrom differ in kind from one another. Instead, the nozzle groups 101 to 103 may be so set up that each of them ejects plural kinds of inks, or may further be so set up that all the nozzle groups 101 to 103 eject the same kind of ink. Here, the number of nozzle groups and the number of nozzles constituting each nozzle group are by no means limited to what are described above and shown in the drawing.

Figure 12A:
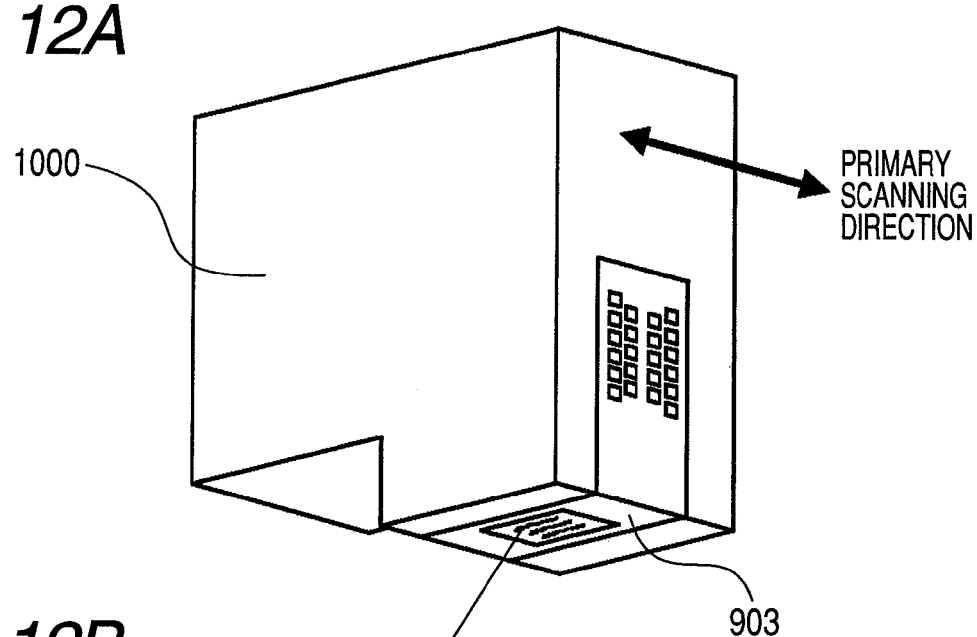
FIG. 12A is a perspective view schematically showing a commonly available ink cartridge having a recording head.
Figure 12B:
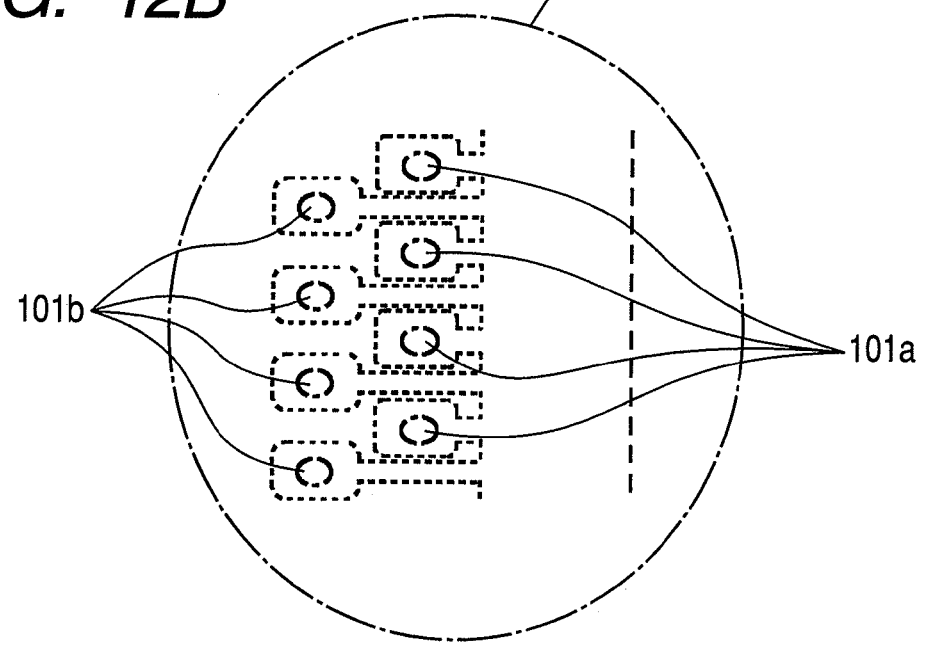
FIG. 12B is an enlarged view of a part of the recording head.

FIGS. 12A and 12B are views showing an ink cartridge holding therein the ink of the present invention. The recording head 901 shown in FIG. 3 is provided at an ejection face 903 of a ink cartridge 1000 which is detachably mountable to a carriage of an ink jet recording apparatus (not shown) and is alternately backward and forward movable in the primary scanning direction.

The ink cartridge 1000 is mounted on the ink jet recording apparatus (not shown). The direction in which the recording head 901 moves when it performs recording (i.e., the primary scanning direction) is the direction shown by an arrow in FIG. 12A, that is, the direction perpendicular to the columns of the nozzle groups 101 to 103. Besides the form shown in the drawing, the ink cartridge may also be set up as an ink cartridge having an ink storage portion(s) in which cartridge the recording head is separately provided.

FIG. 1 diagrammatically illustrates the nozzle group 101 on the recording head 901 shown in FIG. 3, in the state its nozzle plate 200 (see FIG. 3) is removed and as an enlarged view. For convenience, how a part normally not viewable is set up is also shown in FIG. 1 by broken lines.

Large nozzles 101a are nozzles which eject therefrom ink droplets which are relatively large in volume, and are nozzles which each eject therefrom ink droplets of 2 to 7 pL (picoliters) in volume. Small nozzles 101b are nozzles which eject therefrom ink droplets which are relatively small in volume, and are nozzles which each eject therefrom ink droplets of 1 to 2 pL in volume. In the example shown in FIG. 1, these large nozzles and small nozzles are alternately arranged along one side of a common liquid chamber 700. Then, the large nozzles 101a each have an aperture area which is larger than the aperture area the small nozzles 101b each have.

Figure 2A:
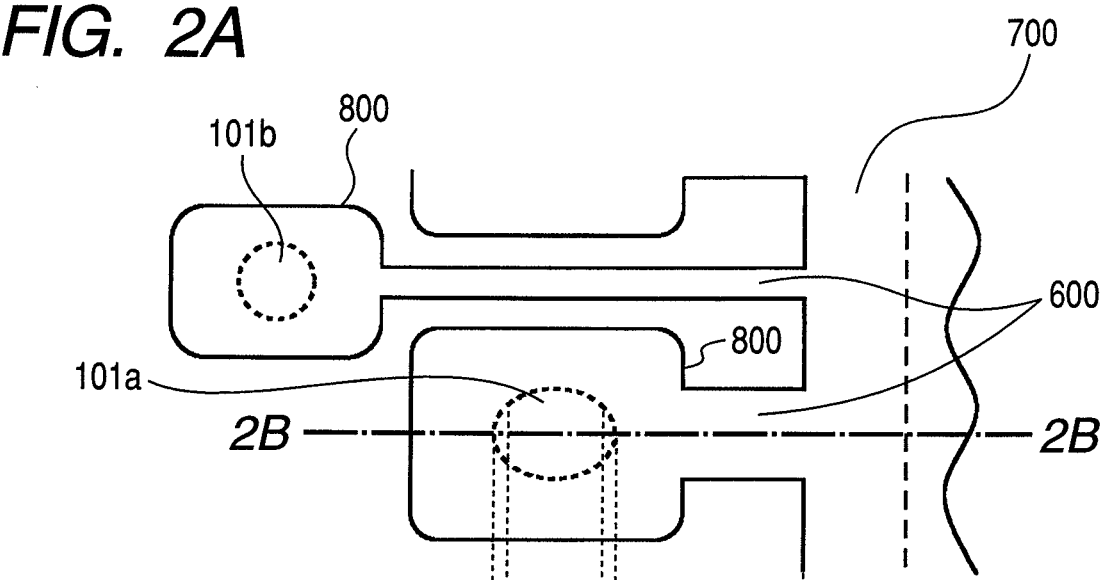
FIG. 2A is an enlarged view of the part A in FIG. 1.
Figure 2B:
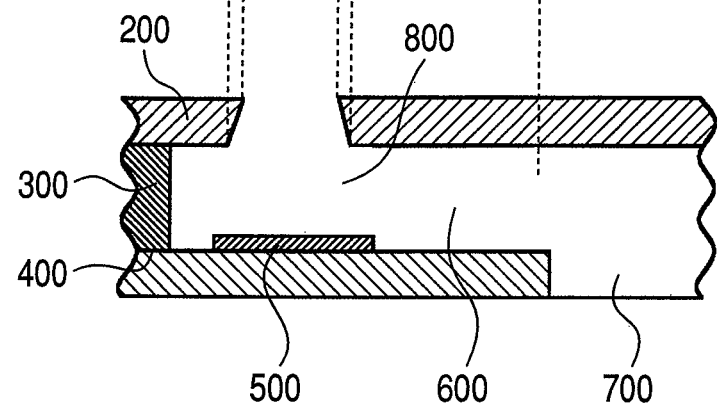
FIG. 2B is a diagrammatic view showing a section of what is cut along the line 2B-2B in FIG. 2A.

FIG. 2A is an enlarged view of the part denoted by A in FIG. 1, and FIG. 2B is a diagrammatic sectional view showing a section of what is cut along the line B-B in FIG. 2A. Incidentally, the sectional view is given in the state the nozzle plate is not removed. As shown in FIG. 2B, the nozzle plate 200 is joined onto a base member 400 via an adhesive layer 300. In the base member 400, a long and narrow opening is also made as part of the common liquid chamber 700.

In the adhesive layer 300, a pressure chamber 800 and an individual channel 600 are formed; the former being a space which faces a heater 500 provided on the surface of the base member 400, and the latter being a channel which communicates with the common liquid chamber 700 and pressure chamber 800. In the nozzle plate 200, a nozzle (each of the large nozzles 101a or small nozzles 101b) is formed which communicates with the pressure chamber 800 to serve as an ink ejection orifice. The pressure chamber 800 with which each large nozzle 101a communicates is larger in volume than the pressure chamber 800 with which each small nozzle 101b communicates.

The ink having been fed from an ink storage portion (not shown) provided on the back side of the recording head 901 and fed to the common liquid chamber 700 in the recording head 901 is introduced into each pressure chamber 800. In the state it is filled with the ink, the heater 500 set in the pressure chamber 800 generates heat by application of electric energy thereto, whereupon the ink bubbles on the heater 500 and the pressure inside the pressure chamber 800 builds up. By the pressure thus developed, the ink is ejected through each of the large nozzles 101a or small nozzles 101b. Here, the recording head 901 may preferably be so set up that the ink is ejected in the direction perpendicular to the base member 400 on which the pressure developing material (heater 500) is disposed in the pressure chamber 800.

Figure 4:
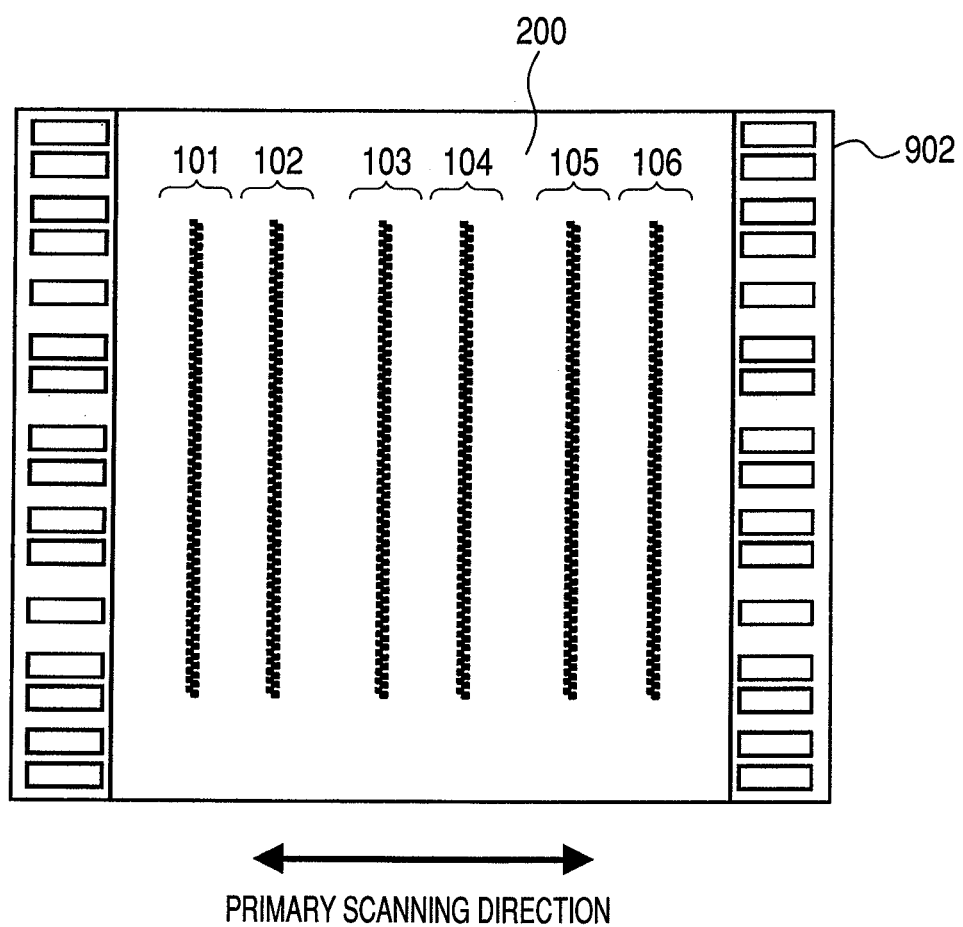
FIG. 4 is a diagrammatic view of a recording head as viewed from the direction opposite to its ejection face.

Recording Head of Second Embodiment:

Another example of nozzle arrangement in a recording head having specific set-up and to which the ink of the present invention is to be applied is described below. FIG. 4 is a diagrammatic view of a recording head 902 for ink jet recording according to a second embodiment and to which the ink of the present invention is to be applied, as viewed from the direction opposite to its ejection face. This recording head 902 is one used in what is called a serial type ink jet recording apparatus, which ejects therefrom ink droplets of two kinds in volume.

In each of six columns of nozzle groups 101 to 106 provided on a nozzle plate 200, two types of nozzles are arranged which eject therefrom ink droplets different in volume from each other for each type of the nozzles. The nozzle groups 101 to 106 may be so set up that inks ejected therefrom differ in kind from one another. Instead, for example, the nozzle groups 101 and 102, the nozzle groups 103 and 104 and the nozzle groups 105 and 106 may be so set up that they are respectively in pairs and each pair of them ejects the same kind of ink. Here, the number of nozzle groups set in pairs and the number of nozzles constituting each nozzle group is by no means limited to what are described above and shown in the drawing.

The recording head 902 shown in FIG. 4 is provided at the ejection face 903 of the ink cartridge 1000 shown in FIG. 12A, which is detachably mountable to a carriage 95 (see FIG. 11) which is fitted to an ink jet recording apparatus and is alternately backward and forward movable in the primary scanning direction. The ink cartridge 1000 is mounted on the ink jet recording apparatus. The direction in which the recording head 902 moves when it performs recording (i.e., the primary scanning direction) is the direction shown by an arrow in FIG. 12A, that is, the direction perpendicular to the columns of the nozzle groups 101 to 106.

Figure 5:
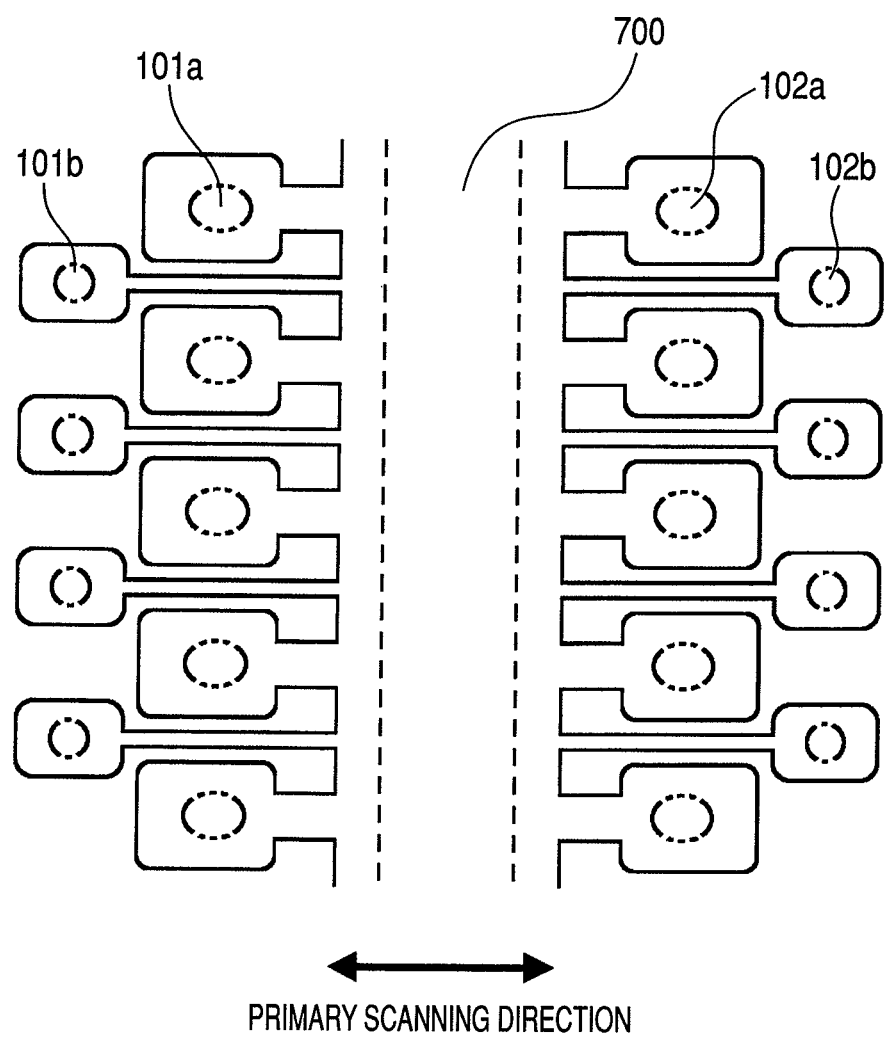
FIG. 5 is a diagrammatic view showing groups of nozzles of the recording head shown in FIG. 4, in the state its nozzle plate is removed.
Figure 6:
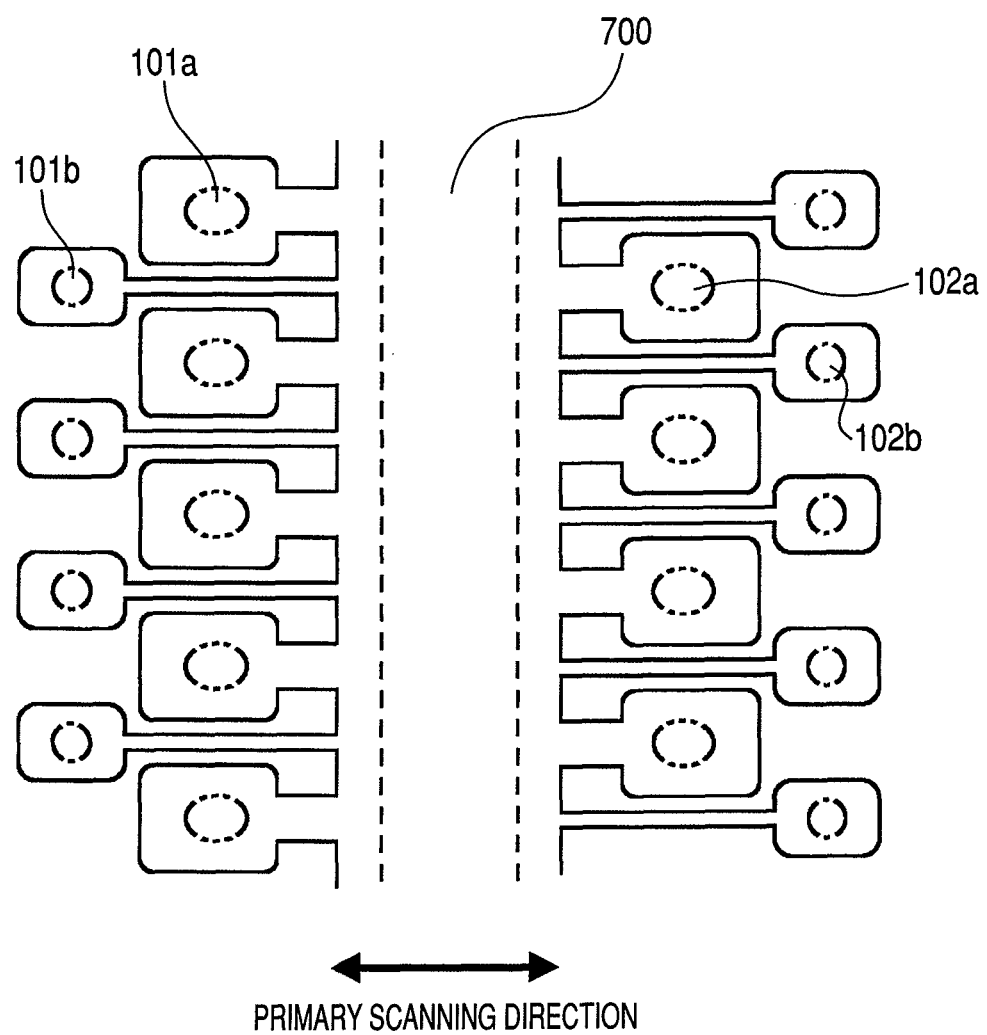
FIG. 6 is a diagrammatic view showing constitution of different nozzle arrangement in nozzle groups adjacent to each other, of the recording head set up as shown in FIG. 4.
Figure 7:
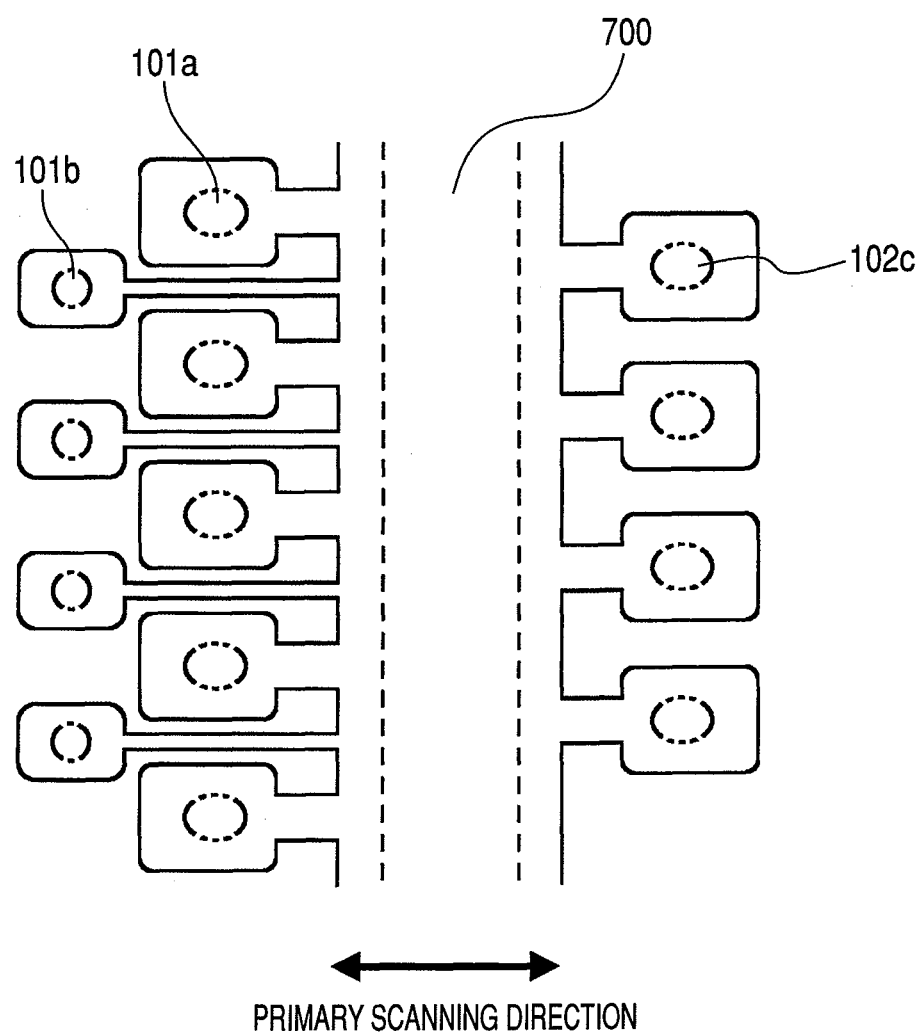
FIG. 7 is a diagrammatic view showing constitution of another different nozzle arrangement in nozzle groups adjacent to each other, of the recording head set up as shown in FIG. 4.

FIGS. 5, 6 and 7 are diagrammatic views each showing another example of nozzle groups in the present invention, and diagrammatically illustrates nozzle groups 101 and 102 on the recording head 902 shown in FIG. 4, in the state the nozzle plate 200 is removed and as enlarged views. For convenience, how parts normally not viewable are set up is also shown in FIGS. 5, 6 and 7 by broken lines.

The recording head to which the ink of the present invention is to be applied may be any one as long as it is a recording head in which first nozzles having relatively short individual channels and second nozzles having relatively long individual channels are alternately arranged at arrangement intervals of less than 30 μm along one side, or a plurality of sides, of the common liquid chamber. Of course, the nozzle arrangements are by no means limited to those shown in FIGS. 5, 6 and 7.

In the nozzle arrangements respectively shown in FIGS. 5, 6 and 7, what differs greatly from the nozzle arrangement shown in FIG. 1 is that the nozzles have the nozzle group 102 at a position where it is opposite the nozzle group 101 interposing a common liquid chamber 700 between the both. Further, in the nozzle arrangement shown in FIG. 5, large nozzles 102a are arranged directly opposite large nozzles 101a having relatively short individual channels, interposing the common liquid chamber 700 between the both, and small nozzles 102b are arranged directly opposite small nozzles 101b having relatively long individual channels. That is, in the nozzle arrangement shown in FIG. 5, ink channels for the nozzles set opposite one another are equal in length. Also, in the nozzle arrangement shown in FIG. 6, ink channels for the nozzles set opposite one another are different in length. Further, in the nozzle arrangement shown in FIG. 7, nozzles 102c (third nozzles) each having a single ink channel length are arranged at a position where they are opposite the nozzle group 101 interposing the common liquid chamber 700 between the both. In the nozzle arrangement shown in FIG. 7, the first nozzles (large nozzles 101a) having relatively short individual channels and the second nozzles (small nozzles 102b) having relatively long individual channels are alternately arranged at arrangement intervals of less than 30 μm along one side of the common liquid chamber, so that the nozzle arrangement satisfies the requirement of the present invention. Thus, the ink channel length of the nozzles 102c and the volume of ink droplets to be ejected may be set in any ways. That is, if the requirement of the constitution of the nozzle arrangement that the first nozzles having relatively short individual channels and the second nozzles having relatively long individual channels are alternately arranged at arrangement intervals of less than 30 μm along one side of the common liquid chamber is satisfied, the nozzle arrangements of the other side of the common liquid chamber are by no means limited.

The ink of the present invention is, as exemplified above, suited for the recording head which is so set up that at least two types of nozzles different in ink channel length are arranged along one side, or a plurality of sides, of the common liquid chamber. The recording head having the nozzle arrangement thus set up is particularly preferable from the viewpoint of achieving the higher image quality of ink jet recorded images and the improvement of recording speed by making the nozzles higher in density.

<Factors in Causing Positional Deviation of Satellite Droplet Impact>

Detailed studies made by the present inventors have revealed that the positional deviation of satellite droplet impact conspicuously comes about when an ink having specific physical properties is applied to a recording head which has such nozzle arrangement as described above and the respective nozzles of which meet the following requirements. More specifically, the positional deviation of satellite droplet impact conspicuously comes about when the ink is applied to the recording head which is so set up that first nozzles having relatively short individual channels and second nozzles having relatively long individual channels are alternately arranged at arrangement intervals of less than 30 μm along one side, or a plurality of sides, of the common liquid chamber. As to the physical properties of the ink causative of the positional deviation of satellite droplet impact conspicuously, their details will be given later.

About the mechanism by which the set-up of the recording head as described above, in particular, the shape of the pressure chambers causes the positional deviation of satellite droplet impact conspicuously, the present inventors presume it as stated below.

The nozzles having a plurality of individual channels which are arranged at arrangement intervals of less than 30 μm are relatively short in distance between their ejection orifices (nozzle apertures) and the both sidewalls of the pressure chambers, compared with nozzles arranged at relatively sparse arrangement intervals. Also, in the recording head, very small differences in position of ejection orifices may come about between individuals in the course of manufacture. Where some ejection orifices stand formed at positions deviating from those at which they should normally be formed, the nozzles formed in a high density as stated above more tend to come to interfere with the both sidewalls of pressure chambers when they eject the ink. As the result, the ink tends to be ejected in the directions different from those normally intended. Hence, this is considered to cause a conspicuous positional deviation in the direction perpendicular to the direction of primary scanning of the recording head, as being different from the positional deviation of ink droplet impact that is due to changes in ejection speed of ink droplets detailed later. Further, as the ink droplets are smaller in volume, they more tend to be affected by the interference of nozzles with both sidewalls of pressure chambers that is due to the above very small differences in position of ejection orifices between individuals. For this reason, the satellite droplets, which are smaller in volume than the primary droplets, have come to undergo such conspicuous positional deviation of droplet impact, as so considered.

<Factors in Causing Positional Deviation of Ink Droplet Impact>

Detailed studies made by the present inventors have further revealed that a conspicuous positional deviation of ink droplet impact that is due to changes in ink ejection speed comes about when the ink applied to the recording head set up as described above has specific physical properties. Stated specifically, a conspicuous positional deviation of ink droplet impact that is due to changes in ink ejection speed comes about when the ink applied to the recording head in which first nozzles having relatively short individual channels and second nozzles having relatively long individual channels are alternately arranged at arrangement intervals of less than 30 μm along one side, or a plurality of sides, of the common liquid chamber has specific physical properties.

Then, it has turned out that, in such a case, the positional deviation of ink droplet (primary-ink droplet) impact comes about in the direction parallel to the direction of primary scanning of the recording head, as being different from the above positional deviation of satellite droplet impact. In addition, this phenomenon may much more come about as the result that the scanning speed in the direction of primary scanning of the recording head is made higher in order to improve the recording speed. As to the physical properties of the ink conspicuously causative of the positional deviation of ink droplet impact that is due to changes in ink ejection speed, their details will be given later.

About the mechanism by which the set-up of the recording head as described above causes changes in ejection speed of ink droplets (primary droplets) to cause a conspicuous positional deviation of ink droplet impact, the present inventors presume it as stated below.

In the recording head as described above, when the ink has been ejected and thereafter meniscuses of the ink, which have receded into nozzles as a result of ejection, return to proper positions in the vicinity of ejection orifices, i.e., when the pressure chambers are refilled with the ink, the ink behaves complicatedly in its flow. Hence, this can be a factor in causing not constant meniscus vibrations, but unstable meniscus vibrations different at every ejection. Being influenced by such unstable meniscus vibrations makes the ejection speed differ at every time the ink is ejected, and this causes a conspicuous positional deviation of ink droplet impact of the primary droplets, as the present inventors presume so.

<Ink>

Components making up the ink of the present invention, physical properties of the ink and so forth are described below in detail.

As a result of detailed studies on the problems discussed above, the present inventors have discovered that the ink constituted according to the present invention is especially effective as the ink to be applied to the recording head having the specific structure as described above. That is, they have discovered that applying the ink of the present invention to the recording head having the specific structure as described above can resolve the technical problems caused peculiarly in such a recording head.

Stated specifically, they reached a finding that the positional deviation of ink droplet impact can thereby be prevented, the uniformity in color on plain paper and the intermittent-ejection stability can be improved and even an improvement in durability of the recording head can also be achieved. The present invention has been made on the basis of such a finding. The main characteristic of the ink of the present invention is that an alkanediol is contained in an aqueous medium constituting the ink and the surface tension of the aqueous medium has been controlled within a specific range.

The reason why the ink of the present invention specifies not the surface tension of the ink, but the surface tension of an aqueous medium constituted only of water and a water-soluble organic compound in the ink is described below.

The problems such as the changes in ejection speed of ink droplets (primary droplets) and the positional deviation of satellite droplet impact as stated above are presumed to be due to the high-density arrangement of nozzles and the surface energy of the ink coming into contact with such nozzles. However, the time interval that extends after the ink has been provided with energy in the pressure chambers and until the ink is ejected is very short.

Accordingly, the present inventors have thought that the initial state of interface formation has a great influence on the movement of the ink in such a very short time range, and have come into a thought that an argument should be made not on the surface tension of the ink in its infinity time, but on a factor that is the surface tension of the aqueous medium. More specifically, the surface energy of ink droplets having been provided with energy and then being just about to be ejected from ejection orifices and also the surface energy of ink droplets standing immediately after they have been ejected therefrom are of very short time range. Hence, the influence of a surfactant or the like present in the ink is considered to be limitlessly small. Then, as a result of detailed studies made by the present inventors, they have discovered that the initial stage of interfaces and the surface tension of the aqueous medium that is a component making up the ink correlate greatly.

The present inventors also presume that this surface tension of the aqueous medium is greatly concerned also with the uniformity in color of solid images formed on plain paper. More specifically, the uniformity in color of solid images formed on plain paper is influenced by the permeability of ink into the plain paper, and they presume that the surface tension of the ink standing immediately after ink droplets have impacted on the recording medium has a great influence on such permeability. As a result of studies made by the present inventors, it has been ascertained that the uniformity in color on plain paper correlates with the surface tension of the aqueous medium.

Surface Tension of Aqueous Medium:

The present inventors have made studies in order to remedy the positional deviation of satellite droplet impact, in the recording head as described above which is so set up that first nozzles having relatively short individual channels and second nozzles having relatively long individual channels are alternately arranged at arrangement intervals of less than 30 µm along one side, or a plurality of sides, of the common liquid chamber. As the result, they have discovered that the aqueous medium in the ink may be controlled to have a surface tension of from 40 mN/m or more to less than 60 mN/m and this enables good achievement of the uniformity in color on plain paper while effectively preventing the positional deviation of satellite droplet impact. By contraries, it has turned out that, if the aqueous medium in the ink has a surface tension of less than 40 mN/m, the positional deviation of satellite droplet impact may come conspicuous and, if it has a surface tension of 60 mN/m or more, the uniformity in color on plain paper may lower because of a lowering of the permeability of ink into plain paper.

Here, the "aqueous medium" referred to in the present invention is termed to mean an aqueous medium in which a coloring material, a surfactant and any additives used optionally are excluded from components making up the ink, that is, to mean a mixed solvent consisting only of water and a water-soluble organic compound. Also, the surface tension in the present invention refers to a value found by measuring it in an environment of a temperature of 25° C. and a humidity (relative humidity) of 50%.

About the mechanism by which the controlling of the surface tension of the aqueous medium in the ink within the above range as specified in the present invention can reduce the positional deviation of satellite droplet impact even when the ink is applied to the recording head having the specific structure as described above, the present inventors presume it as stated below.

That is, if the aqueous medium in the ink has a low surface tension, it comes difficult for each ink droplet to stand one droplet before and after they are ejected, tending to come divided into a plurality of droplets. Then, it is considered that, the lower surface tension the aqueous medium has, the more the ink droplets each tend to come divided into a plurality of droplets which are smaller in volume. As stated above, it is consider that, the smaller the ink droplets are, the more they tend to be influenced by any originally non-uniform energy application coming from the recording head structure and by the interference with pressure chamber walls, and the more the positional deviation of satellite droplet impact may come about.

The present inventors have made studies in order to remedy the positional deviation of ink droplet impact that is due to changes in ink ejection speed, in the recording head which is so set up that first nozzles having relatively short individual channels and second nozzles having relatively long individual channels are alternately arranged at arrangement intervals of less than 30 µm along one side, or a plurality of sides, of the common liquid chamber. As the result, they have discovered that the aqueous medium in the ink may be controlled to have a surface tension of from 50 mN/m or more to less than 60 mN/m and this enables effective prevention of the positional deviation of ink droplet (primary-ink droplet) impact, moreover enables prevention of the positional deviation of satellite droplet impact, and also enables good achievement of the uniformity in color on plain paper. By contraries, it has turned out that, if the aqueous medium in the ink has a surface tension of less than 50 mN/m, it is difficult to effectively prevent the satellite droplets from coming about, and the positional deviation of ink droplet impact that is due to changes in ink ejection speed may come about.

Thus, the aqueous medium in the ink may have a surface tension of from 40 mN/m or more to less than 60 mN/m as described previously, so as to enable prevention of the positional deviation of satellite droplet impact. In addition to this effect, in order to further obtain the effect of preventing the positional deviation of ink droplet impact that is due to changes in ink ejection speed, it is preferable for the aqueous medium in the ink to have a surface tension of 50 mN/m or more. If on the other hand the aqueous medium in the ink has a surface tension of 60 mN/m or more, the uniformity in color on plain paper may lower because of a lowering of the permeability of ink into plain paper.

About the mechanism by which the controlling of the surface tension of the aqueous medium in the ink within the above range can reduce the positional deviation of ink droplet impact that is due to changes in ink ejection speed, even when the ink is applied to the recording head having the specific structure as described above, the present inventors presume it as stated below.

That is, if the aqueous medium in the ink has a low surface tension, it comes difficult for each ink droplet to stand one droplet before and after they are ejected, tending to come divided into a plurality of droplets. As the result, the primary droplets as well come relatively small in volume, and hence they tend to be influenced by the unstable meniscus vibrations coming from the recording head structure as stated above, to come different in ejection speed at every ejection of the ink, as so considered. Thus, the ink of the present invention may be used in which the surface tension of the aqueous medium in the ink stands controlled within the above range, and this enables the satellite droplets from coming about to minimum and the primary droplets (ink droplets) from coming small in volume. As the result, this has enabled effective prevention of the positional deviation of ink droplet impact of such primary droplets, as so considered.

How to Inspect Surface Tension of Aqueous Medium in Ink:

How to inspect the surface tension (static surface tension) of the aqueous medium contained in the ink is described below. First, the type and content of the water-soluble organic compound constituting the aqueous medium contained in an ink the composition of which is unknown may be analyzed by gas chromatography (GC/MS) or the like. Stated specifically, for example, 1 g of an ink the composition of which is unknown is dispensed, and diluted with methanol stated times to prepare a sample, which is then analyzed by GC/MS or the like, whereby the type and content of the water-soluble organic compound contained in the aqueous medium can be determined. As an instrument for GC/MS used in the measurement, TRACE DSQ (trade name; manufactured by ThermoQuest Corporation) or the like may be used, for example. The content of water contained in the ink the composition of which is unknown may also be determined by any conventional method with use of Karl Fischer water content meter or the like.

On the type and content of the water-soluble organic compound constituting the aqueous medium and on the content of water, thus determined, an aqueous medium having the same composition is prepared. Then, the surface tension of the aqueous medium thus obtained is measured in the environment of a temperature of 25° C. and a humidity of 50%. The surface tension may be measured by a plate method making use of a platinum plate. In Examples given later, the surface tension of the aqueous medium is measured with an automatic surface tension meter (CBVP-Z Model, manufactured by Kyowa Interface Science Co., Ltd.). Incidentally, in the present invention, how to measure is by no means limited to the measuring method and measuring instrument given above, and any method may be used.

Surfactant:

The ink of the present invention contains a surfactant. As mentioned previously, the surface tension of the aqueous medium as specified in the present invention takes account of just the surface tension at the initial stage where the ink moves and new interfaces are formed. More specifically, the surface tension in this case is one at the initial stage where the influence of a compound having the ability to lower surface energy by its orientation at interfaces, like the surfactant, is limitlessly small. Accordingly, in the present invention, the ink must be so designed that not the surface tension having lowered as a result of orientation of a surfactant at interfaces, like usual static surface tension, but the surface tension of the aqueous medium itself in the ink, not containing any surfactant and any coloring material, may be within the specific range.

The surfactant in the present invention refers to a compound having surface activity, and any compound may equally be used as long as it is one capable of lowering surface tension of a liquid by its orientation at interfaces. Whether or not a certain compound has such surface activity may be ascertained by using a commonly available dynamic surface tension measuring instrument. In Examples given later, the dynamic surface tension is measured with an instrument which measures dynamic surface tension by the maximum bubble pressure method (Bubble Pressure Tensiometer BP2, manufactured by KRüSS GmbH). Incidentally, in the present invention, how to measure is by no means limited to the measuring method and measuring instrument given above, and any method may be used.

Stated specifically, the dynamic surface tension may be measured and evaluated by such a method as described below, to thereby judge the compound to be the "compound having the ability to lower surface energy by its orientation at interfaces over a period of certain time, i.e., the compound having surface activity". First, an aqueous solution is prepared in which only the compound to be measured is contained in a concentration of about 0.5% by mass. For the aqueous solution obtained, its dynamic surface tension is measured. When the difference in dynamic surface tension between measurement at 10 milliseconds and measurement at 5,000 milliseconds is 3 mN/m or more, in particular, 5 mN/m or more, the compound may be judged by this to be the "compound having surface activity".

The surfactant usable in the ink of the present invention may include, e.g., the following. The surfactant including the following may be used alone or in combination of two or more types. The surfactant in the ink may preferably be in a content (% by mass) of from 0.1% by mass or more to 5.0% by mass or less based on the total mass of the ink.

Nonionic surfactants such as polyoxyethylene alkyl ethers, polyoxyethylene fatty esters, polyoxyethylene alkyl phenyl ethers, polyoxyethylene-polyoxypropylene block copolymer, fatty acid diethanol amide, acetylene glycol ethylene oxide adduct, and acetylene glycol type surfactants; anionic surfactants such as polyoxyethylene alkyl ether sulfates, polyoxyethylene alkyl ether sulfonates, polyoxyethylene alkyl phenyl ether sulfates, polyoxyethylene alkyl phenyl ether sulfonates, alphasulfofatty ester salts, alkylbenzene sulfonates, alkylphenol sulfonates, alkylnaphthalene sulfonates, alkyl tetraphosphosulfonates, and dialkyl sulfosuccinates; cationic surfactants such as alkyl trimethylammonium salts, and dialkyl dimethylammonium chloride; and amphoteric surfactants such as alkyl carboxybetaines.

Alkanediol:

On the ink to be applied to the recording head having the specific structure as described above, the present inventors have made studies in order to remedy its positional deviation of ink droplet impact, to improve its intermittent-ejection stability and further to improve the durability of the recording head. As the result, they have discovered that an alkanediol may be incorporated in the ink and this can achieve such aims at a high level. As to the reason why the alkanediol can remedy the positional deviation of ink droplet impact, improve the intermittent-ejection stability of ink and further improve the durability of the recording head, the present inventors presume it as stated below.

As described previously, it is required in the present invention that the surface tension of the aqueous medium constituting the ink is controlled within the range specified in the present invention. As a compound which is a water-soluble organic compound capable of controlling the surface tension of the aqueous medium in the ink and also has the ability to lower the surface tension of water by its action different from that of the surfactant, it may include, besides the alkanediol, e.g., glycol ether compounds and alcohols. These have the action to lower the surface tension by the cutting of hydrogen bonds of water molecules instantaneously after they are well mixed with water or the like. This action differs from the action that a surfactant comes oriented on water surface over a period of certain time and as a result thereof lowers the surface tension.

However, these glycol ether compounds and alcohols have a high solubility to the compounds constituting the ink.

Hence, where an ink containing any one of the glycol ether compounds and alcohols is applied to the recording head having been made high in nozzle density as questioned in the present invention, there may be the following problem. That is, in such a case, the controlling of the surface tension of the aqueous medium may bring out the effect of preventing the positional deviation of satellite droplet impact and the positional deviation of ink droplet impact that is due to changes in ink ejection speed, but it is very difficult to improve the durability of the recording head and the intermittent-ejection stability of the ink.

In contrast thereto, according to the studies made by the present inventors, the following good effect is obtainable when an alkanediol is incorporated in the ink. That is, the alkanediol can control the surface tension of the aqueous medium like the above glycol ether compounds and alcohols and in addition thereto it has a low dissolving power to various compounds. Hence, the durability of the recording head can be improved even where the ink is applied to the recording head having been made high in nozzle density as questioned in the present invention.

According to the studies made by the present inventors, it is necessary to use the alkanediol in the ink to be applied to the recording head achievable of higher image quality of ink jet recorded images and improvement of recording speed as questioned in the present invention. From the viewpoint of the viscosity of ink and the dissolving power to coloring materials, the alkanediol in the ink of the present invention may preferably be in a content (% by mass) set within the following range.

That is, the alkanediol in the ink may preferably be in a content (% by mass) of from 1.0% by mass or more to 20.0% by mass or less, more preferably from 1.0% by mass or more to 15.0% by mass or less, and particularly preferably from 1.0% by mass or more to 10.0% by mass or less, based on the total mass of the ink.

What is usable as the alkanediol constituting the ink of the present invention may include the following. Any of these may be used alone or in combination of two or more types. For example, ethylene glycol, 1,2-propanediol, 1,3-propanediol, 2-methyl-1,3-propanediol, 2,2-dimethyl-1,3-propanediol, 1,2-butanediol, 1,3-butanediol, 1,4-butanediol, 2-methyl-1,4-butanediol, 2,3-dimethyl-1,4-butanediol, 2,2-dimethyl-1,4-butanediol, 1,2-pentanediol, 1,5-pentanediol, 3-methyl-1,5-pentanediol, 2,2-dimethyl-1,5-pentanediol, 1,2-hexanediol and 1,6-hexanediol. Of course, in the present invention, examples are by no means limited to these.

As a result of detailed studies made by the present inventors, they have also discovered that, of the alkanediols enumerated above, an alkanediol with structure having hydroxyl groups at both terminals of the main chain may be used and this enables more improvement of intermittent-ejection stability of the ink. About the mechanism by which the alkanediol with structure having hydroxyl groups at both terminals of the main chain can improve the intermittent-ejection stability, the present inventors presume it as stated below.

First, such an alkanediol having hydroxyl groups at both terminals of the main chain is commonly known to also generally have a low dissolving power to coloring materials. Hence, it is considered that, with progress of evaporation of water from nozzle tips during non-service of nozzles, the alkanediol increases in concentration at the nozzle tip portions and comes to have a lower dissolving power to coloring materials, and hence any coloring material diffuses toward nozzle interiors where it is relatively highly soluble. As the result, the coloring material comes to present sparsely at the nozzle tips, and the ink at the nozzle tips is kept from increasing in viscosity during non-service of nozzles, so that the ink can be improved in its intermittent-ejection stability, as so considered.

The alkanediol with structure having hydroxyl groups at both terminals of the main chain may include the following: For example, ethylene glycol, 1,3-propanediol, 2-methyl-1,3-propanediol, 2,2-dimethyl-1,3-propanediol, 1,4-butanediol, 2-methyl-1,4-butanediol, 2,3-dimethyl-1,4-butanediol, 2,2-dimethyl-1,4-butanediol, 1,5-pentanediol, 3-methyl-1,5-pentanediol, 2,2-dimethyl-1,5-pentanediol and 1,6-hexanediol. Of course, in the present invention, examples are by no means limited to these.

The present inventors have also discovered that the effect of making the ink only slightly accumulative in intermittent ejection (this is herein called "non-accumulativity in intermittent ejection") is obtainable when the alkanediol having hydroxyl groups at both terminals that is to be incorporated in the ink has 4 to 8 carbon atoms. More specifically, where the alkanediol having hydroxyl groups at both terminals of the main chain has less than 4 carbon atoms, the coloring material comes relatively high soluble in the ink, and hence the ink at the nozzle tips may come unable to be kept from increasing in viscosity during non-service of nozzles, to tend to come to have a low intermittent-ejection stability. Where on the other hand the alkanediol having hydroxyl groups at both terminals of the main chain has 9 or more carbon atoms, such a compound comes poorly soluble in water and in addition thereto the ink comes highly viscous, and hence the ink may come to have a low intermittent-ejection stability to tend to also come to have a low non-accumulativity in intermittent ejection.

This non-accumulativity in intermittent ejection is termed to mean not that the intermittent ejection is performable once but that it is performable a plurality of times. A lowering of this non-accumulativity in intermittent ejection may make any normal recording not performable unless the recovery operation of ejection is conducted every time the recording is performed for a certain while. However, in such a case, the recording speed lowers because such recovery operation is repeated. Such a circumstance makes it difficult to improve the recording speed as required nowadays. The present inventors have found that, in the recording head achievable of higher image quality of recorded images, good recording speed and also cost saving as intended in the present invention, nozzles and ink channel are markedly made compact, and this may greatly lower not only the intermittent-ejection stability but also this non-accumulativity in intermittent ejection. About the reason why making the nozzles and ink channel compact lowers the non-accumulativity in intermittent ejection, the present inventors consider it as stated below.

That is, as the nozzles are smaller, the ink evaporates in a larger quantity on the one hand, and on the other hand its flow resistance increases relatively because of an influence of such small ink channel. This is disadvantageous for the diffusion of a coloring material stated above, and hence the intermittent-ejection stability may lower. Further, making the nozzles compact also makes pressure developing elements small, and hence ink ejection power comes relatively weak. This makes it unable for the ink having increased in viscosity and present at nozzle tips to be all ejected therefrom at one-time ejection. Hence, the ejection may become lower every time the intermittent ejection is repeated, and the ink is accumulated at the nozzle tips, resulting in a great lowering of the non-accumulativity in intermittent ejection, as so considered.

The alkanediol having hydroxyl groups at both terminals of the main chain and having 4 to 8 carbon atoms that is usable in the present invention may include the following: 2-Methyl- 1,3-propanediol, 2,2-dimethyl-1,3-propanediol, 1,4-butanediol, 2-methyl-1,4-butanediol, 2,3-dimethyl-1,4-butanediol, 2,2-dimethyl-1,4-butanediol, 1,5-pentanediol, 3-methyl-1,5-pentanediol, 2,2-dimethyl-1,5-pentanediol and 1,6-hexanediol. Of course, in the present invention, examples are by no means limited to these.

Aqueous Medium:

In the ink of the present invention, an aqueous medium which is a mixed solvent of water and a water-soluble organic compound may also be used within a range that enables the surface tension of the aqueous medium to be controlled within the range described above. As the water, it is preferable to use deionized water (ion-exchanged water). The water in the ink may preferably be in a content (% by mass) of from 10.0% by mass or more to 90.0% by mass or less based on the total mass of the ink.

As described previously, the surface tension of the aqueous medium as specified in the present invention is just the surface tension at the initial stage where the ink moves and new interfaces are formed, and is the surface tension at the initial stage where the influence of a compound having the ability to lower surface energy by its orientation at interfaces over a period of certain time, like the surfactant, is limitlessly small. Hence, in the present invention, what is termed as the water-soluble organic compound does not include what is called the surfactant as defined in the present invention, which has the ability to lower surface energy by its orientation at interfaces.

The water-soluble organic compound usable in the ink of the present invention is a compound other than the surfactant, and is water-soluble. Usable are an alcohol, a polyhydric alcohol, a polyglycol, a glycol ether, a nitrogen-containing polar solvent, a sulfur-containing polar solvent and the like. The water-soluble organic compound in the ink of the present invention may preferably be in a content (% by mass), as content inclusive of the above alkanediol, of from 5.0% by mass or more to 90.0% by mass or less, and more preferably from 10.0% by mass or more to 50.0% by mass or less, based on the total mass of the ink. If the water-soluble organic compound is in a content below the above range, any reliability such as ejection stability may be not obtainable when the ink is used in ink jet recording apparatus. If on the other hand the water-soluble organic compound is in a content beyond the above range, the ink may increase in viscosity to cause faulty feeding of the ink.

As the water-soluble organic compound, stated specifically, the following may be used. Any of the following water-soluble organic solvents may be used alone or in combination of two or more types.

Alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; glycols such as propylene glycol, butylene glycol, diethylene glycol, triethylene glycol and hexylene glycol; alkylene glycols whose alkylene groups have 2 to 6 carbon atoms, such as 1,2,6-hexanetriol; alkyl ether acetates such as polyethylene glycol monomethyl ether acetate; alkyl ethers of polyhydric alcohols, such as ethylene glycol monomethyl (or monoethyl) ether, diethylene glycol methyl (or ethyl)ether and triethylene glycol monomethyl (or monoethyl)ether; and N-methyl-2-pyrrolidone, 2-pyrrolidone and 1,3-dimethyl-2-imidazolidinone. Of course, in the present invention, examples are by no means limited to these.

The Other Components:

The ink of the present invention may also optionally contain, besides the components described above and the coloring material explained below, any of water-soluble organic compounds which are solids at normal temperature, as exemplified by polyhydric alcohols such as trimethylolpropane and trimethylolethane, urea, and urea derivatives such as ethylene urea. The ink of the present invention may further optionally contain various additives such as a pH adjuster, a rust preventive, an antiseptic agent, a mildew-proofing agent, an antioxidant, a reduction-preventive agent, an evaporation accelerator, a chelating agent and a water-soluble polymer.

The present inventors have also discovered that, in particular, an ink constituted as described below is preferable as the ink to be applied to the recording head set up as described above that is achievable of higher image quality of recorded images and improvement of recording speed.

That is, it is an ink in which the alkanediol having hydroxyl groups at both terminals of the main chain and having 4 to 8 carbon atoms and ethylene urea are used in combination, and this can bring the following effect. Where such an ink is applied to the recording head set up as described above, in addition to the positional deviation of satellite droplet impact, the positional deviation of ink droplet impact that is due to changes in ink ejection speed, the durability of the recording head, the intermittent-ejection stability and the uniformity in color on plain paper, the recording head can be improved in nozzle clogging recoverability. This can make normal recording performable upon less recovery operation even where the ink jet recording apparatus has been left to stand for a certain period of time, and hence is preferable from the viewpoint of the improvement in recording speed. The ethylene urea in the ink may preferably be in a content (% by mass) of from 2.0% by mass or more to 20.0% by mass or less based on the total mass of the ink, in order to achieve both the intermittent-ejection stability and the nozzle clogging recoverability.

Coloring Material:

As the coloring material constituting the ink of the present invention, any coloring material may be used as long as it is a water-soluble or water-dispersible coloring material (such as a dye or a pigment). The coloring material in the ink may preferably be in a content (% by mass) of from 0.5% by mass or more to 10.0% by mass or less, and more preferably from 1.0% by mass or more to 10.0% by mass or less, based on the total mass of the ink. The coloring material may be used alone or in combination of two or more types.

The present inventors have still also discovered that, as the coloring material constituting the ink of the present invention, it is preferable to use a compound represented by the following General Formula (I).

That is, they have found that employment of such constitution can effectively lessen the positional deviation of satellite droplet impact and the positional deviation of ink droplet impact that is due to changes in ink ejection speed, and further can simultaneously achieve further favorable color developability and weatherability and the improvement of uniformity in color on plain paper. About the reason why the use of the compound of the following General Formula (I) can markedly improve the uniformity in color on plain paper while well achieving various performance, the present inventors consider it as stated below.

The compound of General Formula (I) has a relatively large molecular weight, and has a good weatherability of the image on the one hand, but on the other hand, because of such a large molecular weight, has a relatively low color developability per unit mass, compared with commonly available coloring materials. Further, in the case of very small ink droplets as in the present invention, it may have a low color developability on components relatively low in wettability (what is called vessels) on plain paper.

Hence, if the aqueous medium in the ink has a surface tension of 60 mN/m or more, the ink may have a low wettability to plain paper and, in addition thereto, the compound of General Formula (I) may also have a low color developability. Hence, the uniformity in color on plain paper may lower much more. In contrast thereto, since in the ink of the present invention the surface tension of the aqueous medium is set to be less than 60 mN/m, the use of the compound of General Formula (I) has brought a remarkable improvement in the uniformity in color on plain paper, as so considered.

In the present invention, the R's in General Formula (I) may each preferably be a hydrogen atom, an alkyl group or a cyclohexyl group, may more preferably be an alkyl group, and particularly preferably be a methyl group.

The X in General Formula (I) is a linking group. The linking group may include, e.g., the following linking groups 1 to 7. In the linking groups 1 to 7, each bonding arm provided with a mark "*" is the bonding arm of each nitrogen atom, and the respective nitrogen atoms and the two different triazine rings in General Formula (I) combine directly. Of the following linking groups, it is particularly preferable to use Linking Group 1.

General Formula (I)

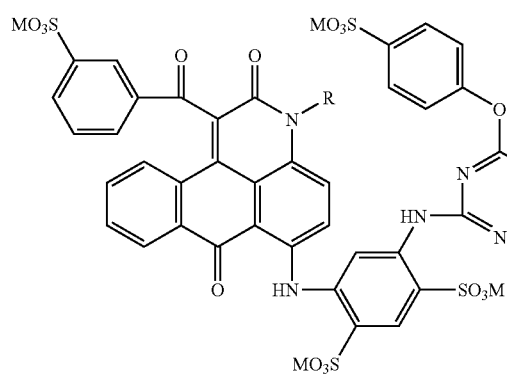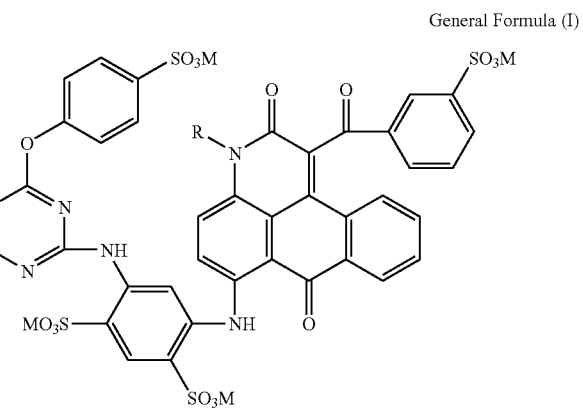

In General Formula (I), R's are each independently a hydrogen atom, an alkyl group, a hydroxyalkyl group, a cyclohexyl group or a mono- or dialkylaminoalkyl group; M's are each independently a hydrogen atom, an alkali metal, ammonium, or an organic ammonium; and X is a linking group.

The R's in General Formula (I) are each independently a hydrogen atom, an alkyl group, a hydroxyalkyl group, a cyclohexyl group or a mono- or dialkylaminoalkyl group, and these substituents are described below in greater detail.

The alkyl group may include alkyl groups having 1 to 8 carbon atoms. Stated specifically, it may include methyl, ethyl, n-propyl, iso-propyl, n-butyl, sec-butyl, t-butyl iso-butyl, n-pentyl, n-hexyl, n-heptyl and n-octyl.

The hydroxyalkyl group may include hydroxyalkyl groups having 1 to 4 carbon atoms. Stated specifically, it may include hydroxymethyl, hydroxyethyl, hydroxypropyl and hydroxybutyl. The alkyl in the hydroxyalkyl groups may include a straight-chain alkyl, a branched-chain alkyl and a cyclic alkyl, and the straight-chain alkyl is particularly preferred. The position of substitution of the hydroxyl in the above alkyl may be any position, and what is particularly preferred is one in which the hydroxyl is substituted at the terminal, as exemplified by 2-hydroxyethyl, 3-hydroxypropyl and 4-hydroxybytyl.

The monoalkylaminoalkyl group may include mono-1 to 4 carbon atom alkylamino-1 to 4 carbon atom alkyl group. Stated specifically, it may include monomethylaminopropyl and monoethylaminopropyl.

The dialkylaminoalkyl group may include di-1 to 4 carbon atom alkylamino-1 to 4 carbon atom alkyl group. Stated specifically, it may include dimethylaminopropyl and diethylaminoethyl.

Linking Group 1

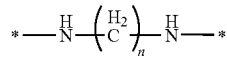

In Linking Group 1, n is an integer of 2 to 8, preferably 2 to 6, and more preferably 2, and *'s are respectively the sites of linkage to the two different triazine rings.

Linking Group 2

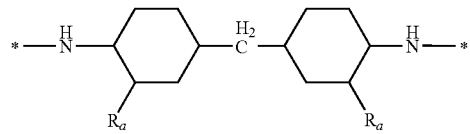

In Linking Group 2, Ra's are each independently a hydrogen atom or a methyl group, and *'s are respectively the sites of linkage to the two different triazine rings.

Linking Group 3

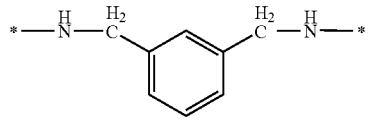

In Linking Group 3, *'s are respectively the sites of linkage to the two different triazine rings.

Linking Group 4

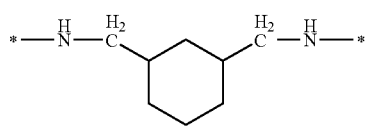

In Linking Group 4, *'s are respectively the sites of linkage to the two different triazine rings.

Linking Group 5

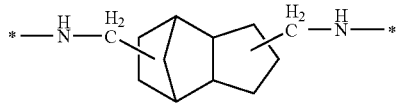

In Linking Group 5, *'s are respectively the sites of linkage to the two different triazine rings.

Linking Group 6

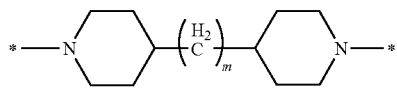

In Linking Group 6, m is an integer of 2 to 4, and *'s are respectively the sites of linkages to the two different triazine rings.

Linking Group 7

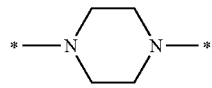

In Linking Group 7, *'s are respectively the sites of linkage to the two different triazine rings.

The M's in General Formula (I) are each independently a hydrogen atom, an alkali metal, ammonium, or an organic ammonium. The alkali metal may include, e.g., lithium, sodium and potassium. The organic ammonium may include, e.g., acetamido, benzamido, trimethylamino, butylamino, diethylamino, phenylamino and triethanolamino.

The alkyl group in General Formula (I) may preferably be one having 1 to 3 carbon atoms, from the viewpoint of solubility in the aqueous medium constituting the ink. Stated specifically, it may include a methyl group, an ethyl group, a primary propyl group and a secondary propyl group. If the alkyl group has 4 or more carbon atoms, the coloring material may come hydrophobic so greatly as not to dissolve in the aqueous medium constituting the ink.

As preferred examples of the compound of General Formula (I), it may include the following Exemplified Compounds 1 and 2. The following exemplified compounds are given in the form of free acids. Of course, in the present invention, examples are by no means limited to the following Exemplified Compounds as long as they are included in the structure represented by General Formula (I) and in the definition thereof. In the present invention, of the following exemplified compounds, it is particularly preferable to use Exemplified Compound 1. Of course, in the present invention, the compound of General Formula (I) and any other coloring material may optionally be used in combination.

Exemplified Compound 1

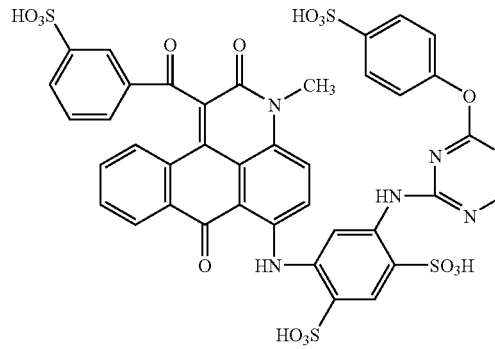
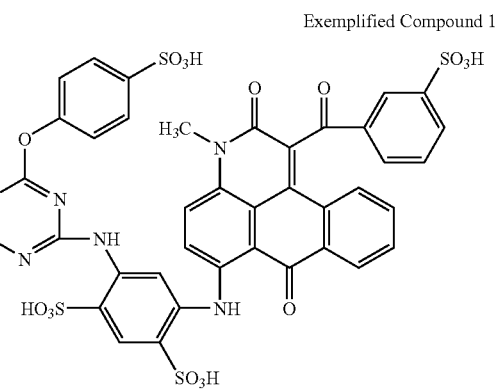

Exemplified Compound 2

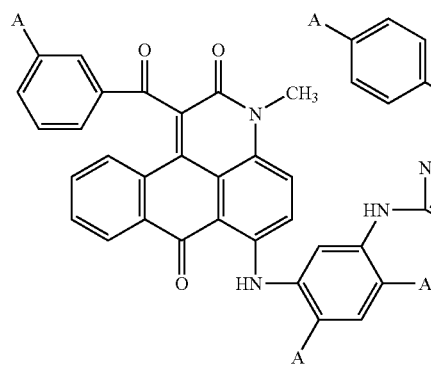
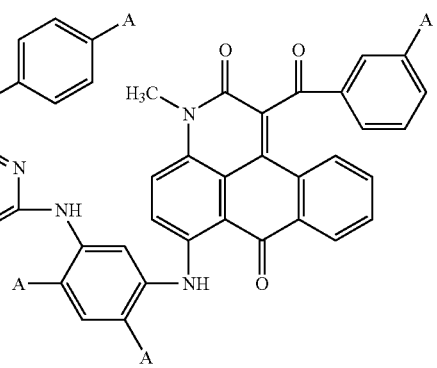

[A in the formula: $SO_3^- \cdot HN^+(CH_2CH_2OH)_3$]

How to Inspect Coloring Material:

To inspect whether or not the coloring material shown by the compound of General Formula (I) as used in the present invention is contained in the ink, a method of inspection on the following (1) to (3) may be used which makes use of high-speed liquid chromatography (HPLC).

(1) Retention time of peaks.

(2) Maximum absorption wavelength about the peaks in (1).

(3) M/Z (posi.) and M/Z (nega.) of the mass spectrum about the peaks in (1).

Conditions for making analysis by the high-speed liquid chromatography are as shown below. A liquid (ink) diluted with pure water to about 1/1,000 is used as a measuring sample. Then, the analysis by the high-speed liquid chromatography is made under the following conditions to measure the retention time of peaks and the maximum absorption wavelength about the peaks.

Column: SunFire $C_{18}$ (available from Nihon Waters K.K.), 2.1 mm×150 mm.

Column temperature: 40° C.

Flow rate: 0.2 mL/min.

PDA: 200 nm to 700 nm.

Mobile phase and gradient conditions: Table 1 below.

TABLE 1

| Mobile Phase and Gradient Conditions | | | | |
|---|---|---|---|---|
| | 0 to 5 minutes | 5 to 24 minutes | 24 to 31 minutes | 31 to 45 minutes |
| A: Water | 85% | 85%→45% | 45%→0% | 0% |
| B: Methanol | 10% | 10%→50% | 50%→95% | 95% |
| C: Aqueous 0.2 mol/L ammonium acetate solution | 5% | 5% | 5% | 5% |

Conditions for analyzing the mass spectrum are as shown below. About the peaks obtained, the mass spectrum is measured under the following conditions, and the M/Z detected most strongly is measured for each positive and negative.

Ionization.

ESI.

Capillary voltage: 3.5 kV.

Desolvating gas: 300° C.

Ionic source temperature: 120° C.

Detector.

posi.: 40 V, 200-1,500 amu/0.9 sec.

nega.: 40 V, 200-1,500 amu/0.9 sec.

Under the conditions shown above, measurement is made on Exemplified Compound 1, a specific example of the compound of General Formula (I). The values thus found on the retention time, maximum absorption wavelength, M/Z (posi.) and M/Z (nega.) are shown in Table 2. The foregoing means that an unknown ink, when measured by the same method and under the same conditions as the above and found applicable to the analysis results shown in Table 2, can be judged to be an ink containing a compound coming under the compound defined in the present invention.

TABLE 2

| | Analysis Results | | | |
|---|---|---|---|---|
| | Retention time | Maximum absorption wavelength | M/Z | |
| | (min.) | (nm) | posi. | nega. |
| Exemplified Compound 1 | 18.0-19.0 | 500-520 | 990-993 | 987-990 |

<Ink Set>

When full-color images or the like are formed, the ink of the present invention may be used as an ink set in combination with an ink or inks which is/are different in color from the ink of the present invention. The ink of the present invention may preferably be used in combination with at least one ink selected from, e.g., a black ink, a cyan ink, a magenta ink, a yellow ink, a red ink, a green ink, a blue ink and so forth. Also, what is called a light-color ink(s) having substantially the same color tone(s) may further be used in combination. Coloring materials usable for these inks or light-color inks may be either of known coloring materials or coloring materials synthesized as novel ones.

The present inventors have also discovered that, in the ink set making use of the ink of the present invention, the following effect is obtainable when the compound represented by General Formula (I) as described previously is used as a coloring material used for the magenta ink. That is, they have discovered that, in such a case, especially on plain paper, black images formed using the ink in combination with the other color inks can have superior uniformity in color. About the mechanism by which the uniformity in black color images formed on plain paper by using a plurality of color inks is improved, the present inventors presume it as stated below.

That is, in the ink set of the present invention, the ink making use of the compound represented by General Formula (I) has a superior uniformity in color on plain paper as stated above. Hence, the magenta ink making use of the compound represented by General Formula (I) can well permeate into recording mediums also when black images are formed using a plurality of color inks, and the uniformity in color on plain paper is improved also when color-mixed with other inks, as so considered. As to the other inks used together with the ink of the present invention, there are no particular limitations thereon as long as the black-color image can be formed by mixing them. From the viewpoint of formation of full-color images, it is preferable to use the ink of the present invention in combination with inks having yellow and cyan colors. From the viewpoint of gradation, it is also preferable to use it together with an ink having black color alone.

<Ink Jet Recording Method>

The ink of the present invention is used in an ink jet recording method in which the ink is ejected by ink jet recording to record images on a recording medium. The ink jet recording method includes a recording process in which mechanical energy is made to act on an ink to eject the ink, and a recording process in which heat energy is made to act on an ink to eject the ink. In particular, in the present invention, the ink jet recording method that utilizes heat energy may preferably be used.

<Ink Cartridge>

An ink cartridge suited to perform recording by using the ink of the present invention may include an ink cartridge having an ink storage portion which stores therein such an ink. The ink cartridge of the present invention may be provided in the ink cartridge 1000 shown in FIG. 12A.

<Recording Unit>

A recording unit suited to perform recording by using the ink of the present invention may include a recording unit having i) an ink storage portion storing such an ink therein and ii) a recording head for ejecting the ink therefrom; the recording head having the specific set-up as described previously. In particular, a recording unit may preferably be used in which the above recording head ejects an ink by acting heat energy on the ink in accordance with recording signals. In particular, in the present invention, it is preferable to use a recording head having a heat-generating part liquid-contacting surface layer which contains a metal and/or a metal oxide. The metal and/or a metal oxide making up the heat-generating part liquid-contacting surface layer may specifically include, e.g., metals such as Ta, Zr, Ti, Ni and Al, and oxides of these metals.

<Ink Jet Recording Apparatus>

An ink jet recording apparatus suited to perform recording by using the ink of the present invention may include an ink jet recording apparatus having i) an ink storage portion storing such an ink therein and ii) a recording head for ejecting the ink therefrom; the recording head having the specific set-up as described previously. In particular, an ink jet recording apparatus may preferably be used in which the recording head ejects an ink by acting heat energy on the ink in accordance with recording signals; the ink being in the interior of a recording head having an ink storage portion storing the ink therein.

How images are recorded by the recording head applicable to the embodiments described above and the ink jet recording apparatus having the recording head are described below with reference to the related drawings. Reference numeral 101a denotes nozzles which have relatively short ink channel and are relatively large in ejection volume (hereinafter "large nozzles"). Meanwhile, reference numeral 101b denotes nozzles which have relatively long ink channel and are relatively small in ejection volume (hereinafter "small nozzles").

Figure 8A:
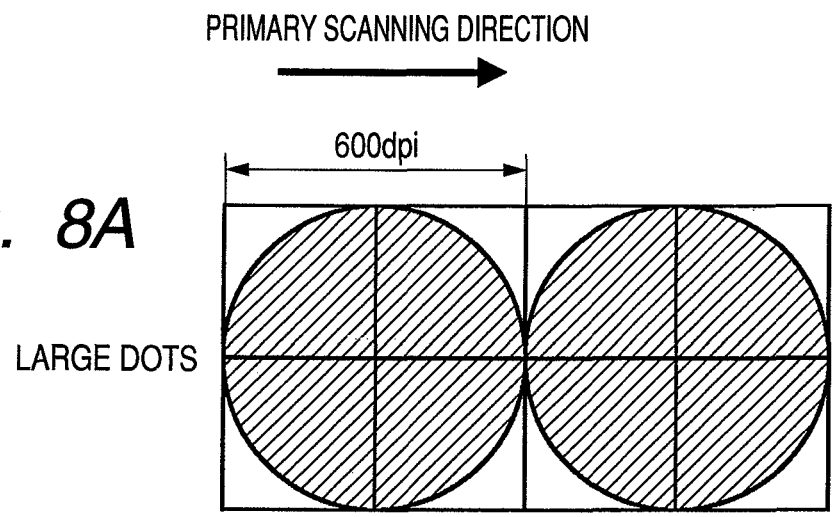
FIGS. 8A and 8B are diagrammatic views to illustrate how recording is performed by a recording head.
Figure 8B:
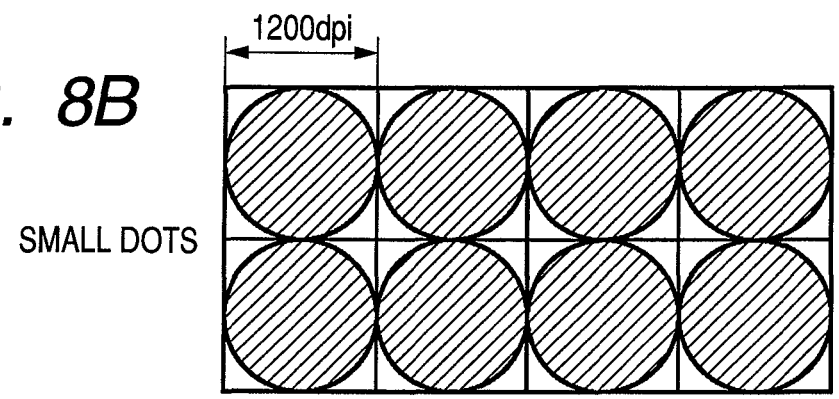

FIG. 8A diagrammatically shows recording (large dots) through large nozzles of about 5 pL each in ejection volume, and FIG. 8B diagrammatically shows recording (small dots) through small nozzles of about 1.2 pL each in ejection volume. Lines show lattices made by dividing recorded areas in accordance with resolution. The small dots can provide images recorded at a high resolution on the one hand, but on the other hand require a four-fold number of dots for making recording density equal to each large dot. Accordingly, where the ejection frequency of small nozzles is set twice the ejection frequency of large nozzles to drive, the recording density of small dots and the recording density of large dots can be made equal to each other with respect to the primary scanning direction of the recording head. As the result, high-speed recording making use of the large dots shown in FIG. 8A can be made less differ in speed from recording in high-image-quality recording making use of the small dots shown in FIG. 8B.

An example of constitution of a drive circuit for a recording head is shown in FIG. 9. This is described below. A heater substrate 401 shown by a broken line in FIG. 9 is provided thereon with the following devices. They are large heaters 500a for the ejection of large ink droplets, small heaters 500a for the ejection of small ink droplets, drive elements 410 for turning the heaters ON/OFF selectively, a drive signal generating circuit 420 which inputs ON/OFF signals to the drive elements, terminals through which electric signals are inputted from the main body of a recording apparatus, and so forth.

Then, once the drive elements 410 are turned ON, power source voltage (VH) is applied to the large heaters 500a and small heaters 500a and the ink is abruptly heated, whereupon film bubbling takes place and the pressure is developed by which the ink is ejected. In general, the drive elements 410 are also divided into some drive blocks in order to restrict the number of heaters to be driven simultaneously. The drive signal generating circuit 420 has logic circuits such as a shift register (not shown), a latching circuit (not shown) which latches (holds as memory) the data sent to the shift register, and a decoding circuit (not shown) which decodes block control signals received in the form of binary data. Here, in the shift register, image data are received by serial access and outputted by parallel access. Then, in the drive signal generating circuit 420 set up in this way, signals from the recording control unit of the recording apparatus main body are received to generate the ON/OFF signals for the drive elements 410.

An example of signals inputted from the recording control unit of the recording apparatus main body is shown in FIG. 10. DATA#L denotes recording data (large data) inputted to large heaters 500a, DATA#S denotes recording data (small data) inputted to small heaters 500a, and BLK denotes block control signals which instructs the drive block number.

Serial data of these are, in synchronization with clock signals CLK, forwarded to the shift register in the drive signal generating circuit. Thereafter, the recording data are stored in the latching circuit through latch signals, and the block control signals are decoded. Certain heaters selected by the product of proposition of the recording data and the block control signals are driven according to the input of heat signals (HEAT#L or HEAT#S). Here, HEAT#L denotes heat signals for the large heaters, and HEAT#S denotes heat signals for the small heaters, where, in order that the ejection frequency for the small dots is set twice that for the large dots as described with reference to FIGS. 8A and 8B, the input period of the HEAT#S is set half that of HEAT#L. Further, the input period of the recording data is also controlled in accord with the period of heat signals so that the small data may be inputted twice in the course the large data are inputted once.

Here, the recording data (DATA#L or DATA#S) and the block control signals BLK are inputted to the heater substrate in the form of different signals. How to input these is by no means limited to this method. For example, these may be set up on the same signal line so as to be one time inputted to the shift register in the drive signal generating circuit of the heater substrate, and this method enables reduction of the terminals in number.

Figure 11:
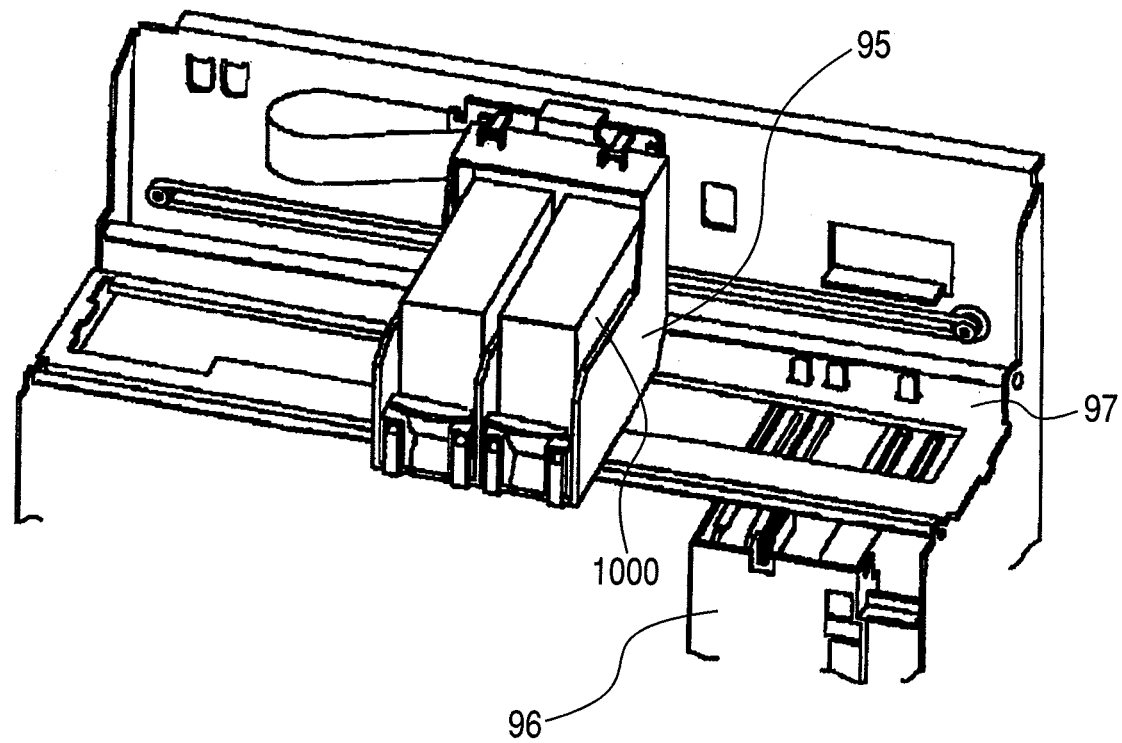
FIG. 11 is a diagrammatic view showing an example of a recording apparatus to which the recording head is mountable.

Finally, an example of the ink jet recording apparatus to which the recording head of the present invention is mountable is described with reference to FIG. 11. The recording apparatus shown in FIG. 11 is provided therein with at least a carriage 95 to which a ink cartridge 1000 is detachably mountable, and a recording head recovery unit 96. The recording head recovery unit 96 is incorporated with a cap for preventing the ink from evaporating from a plurality of ejection orifices of the recording head, and a suction pump for sucking the ink from the plurality of ejection orifices. Reference numeral 97 in FIG. 11 denotes a paper feed face over which the recording medium is to be transported. In FIG. 11, what is shown is the ink cartridge 1000 as a form having an ink storage portion which stores the ink therein. Without limitation thereto, the ink cartridge may also be so set up that the recording head and the ink storage portion are set independent.

The carriage 95 is positioned on the recovery unit 96 as home position, and is scanned in the right-and-left direction as viewed in the drawing (i.e., the primary scanning direction), in accordance with signals inputted from a recording control unit (not shown). The recording medium is transported in the direction falling at right angles with the primary scanning direction of the carriage 95.

EXAMPLES

The present invention is described below in greater detail by giving Examples and Comparative Examples. The present invention is by no means limited by the following Examples unless it is beyond its gist. In the following, "part(s)" or "%" in the items "Preparation of Coloring Material" and "Preparation of Inks" is by mass unless particularly noted.

<Preparation of Coloring Material>

Synthesis of Exemplary Compound 1:

The following procedure of Steps A to G was followed to synthesize the following Exemplified Compound 1 used in Examples and Comparative Examples.

Exemplified Compound 1

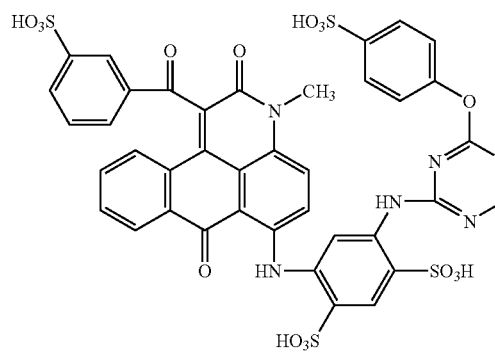
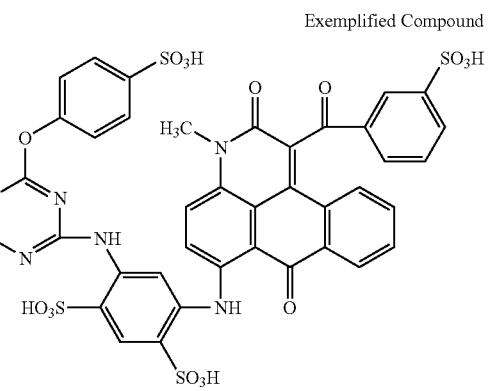

Step A: To 360 parts of xylene, 94.8 parts of a compound of the following Formula (1), 3.0 parts of sodium carbonate and 144.0 parts of ethyl benzoylacetate were added in this order with stirring, and the liquid obtained was heated to a temperature of 140 to 150° C. to carry out reaction for 8 hours. During the reaction, ethanol and water which were generated in the reaction were distilled off while effecting azeotropic distillation with the xylene to complete the reaction. The reaction liquid obtained was cooled to a temperature of 30° C., then 240 parts of methanol was added thereto, and these were stirred for 30 minutes. Thereafter, the solid precipitated was collected by filtration. The solid thus obtained was washed with 360 parts of methanol, followed by drying to obtain 124.8 parts of a compound of the following Formula (2) as pale yellow acicular crystals.

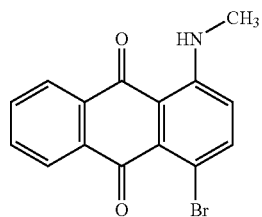

Formula (1)

Formula (2)

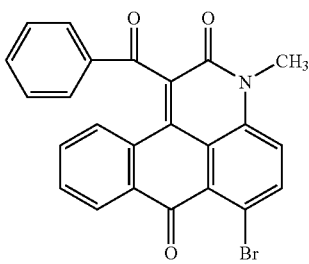

Step B: To 300.0 parts of N,N-dimethylformamide, 88.8 parts of the compound of Formula (2) obtained as above, 75.0 parts of m-aminoacetanilide, 24.0 parts of copper acetate monohydrate and 12.8 parts of sodium carbonate were added in this order with stirring. Then, the liquid obtained was heated to a temperature of 120 to 130° C. to carry out reaction for 3 hours. The reaction liquid obtained was cooled to about 50° C., then 120 parts of methanol was added thereto, and these were stirred for 30 minutes. Thereafter, the solid precipitated was collected by filtration. The solid thus obtained was washed with 500 parts of methanol, and then with 80° C. hot water, followed by drying to obtain 79.2 parts of a compound of the following Formula (3) as bluish red crystals.

Formula (3)

Step C: To 130 parts of 98% sulfuric acid and, with water-cooling, 170 parts of 28% fuming sulfuric acid was added with stirring to prepare 300 parts of 12% fuming sulfuric acid. With water-cooling, 51.3 parts of the compound of Formula (3) obtained as above was added thereto at a temperature of 50° C. or less. Thereafter, the liquid obtained was heated to a temperature of 85 to 90° C. to carry out reaction for 4 hours.

The reaction liquid obtained was added to 600 parts of ice water, during which, with addition of ice, the liquid temperature was kept from rising because of heat generation, to keep the temperature of the liquid so as not to exceed 40° C. Further, water was added thereto to make the reaction liquid come to 1,000 parts in quantity, followed by filtration to remove non-dissolved matter. To the mother liquid obtained, hot water was added to add up to 1,500 parts. While keeping the liquid temperature at 60 to 65° C., 300 parts of sodium chloride was added thereto, and these were stirred for 2 hours, where the crystals precipitated were collected by filtration. The crystals thus obtained were washed with 300 parts of an aqueous 20% sodium chloride solution, and then water was squeezed off to obtain 100.3 parts of wet cake as red crystals, containing 59.2 parts of a compound of the following Formula (4).

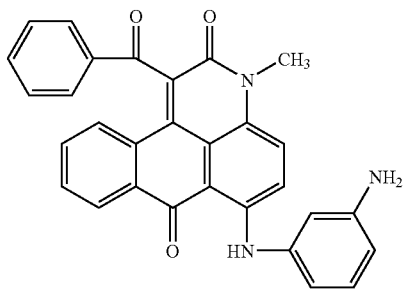

Formula (4)

Step D: To 60 parts of water, 67.7 parts of the wet cake containing the compound of Formula (2) obtained as above was added. Next, 24 parts of an aqueous 25% sodium hydroxide solution was added thereto, and these were stirred. Further, while adding an aqueous 25% sodium hydroxide solution to adjust the pH of the liquid to 3 to 4, the compound was dissolved. Meanwhile, to 60 parts of ice water, 0.4 part of LIPAL OH (trade name; anionic surfactant available from Lion Corporation) was added, and 8.9 parts of cyanuric chloride was further added thereto, followed by stirring for 30 minutes to obtain a suspension. The suspension obtained was added to the solution containing the compound of Formula (2) obtained as above. Then, while keeping the pH of the liquid to 2.7 to 3.0 by using an aqueous 10% sodium hydroxide solution, reaction was carried out at a temperature of 25-30° C. for 4 hours to obtain a reaction liquid containing a compound of the following Formula (5).

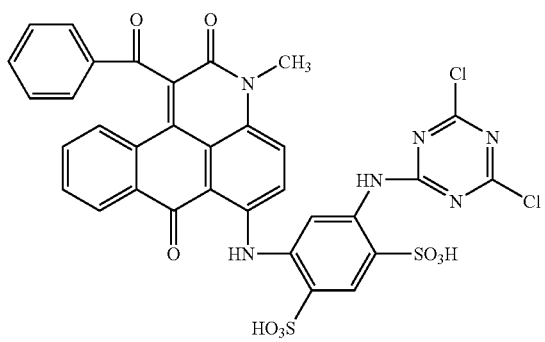

Formula (5)

Step E: To the reaction liquid containing the compound of Formula (5) obtained as above, 9.5 parts of sodium p-phenolsulfonate dehydrate was added. Next, while adding an aqueous 25% sodium hydroxide solution to keep the pH of the liquid to 6.5±0.3, and raising the temperature of the liquid to 50 to 55° C., reaction was carried out at that temperature for 1 hour to obtain a reaction liquid containing a compound of the following Formula (6).

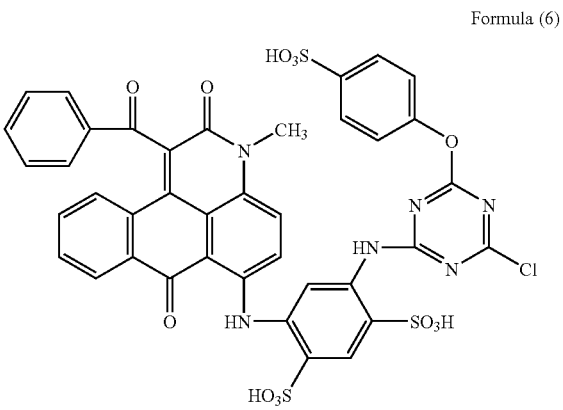 [SMILES: Cn1c(=O)c(C(=O)c2ccccc2)c2c3c(c(Nc4cc(Nc5nc(Cl)nc(Oc6ccc(S(=O)(=O)O)cc6)n5)c(S(=O)(=O)O)cc4S(=O)(=O)O)ccc31)C(=O)c1ccccc1-2]

Formula (6)

Step F: To the reaction liquid containing the compound of Formula (6) obtained as above, 1.2 parts of ethylenediamine was added. Next, adding thereto an aqueous 25% sodium hydroxide solution to keep the pH of the liquid to 7.8 to 8.2, and raising the temperature of the liquid to 78 to 82° C., reaction was carried out at that temperature for 1 hour. Thereafter, water was added thereto to make the liquid come to about 350 parts in quantity, followed by filtration to remove non-dissolved matter. To the mother liquid obtained, water was added to add up to 400 parts in quantity. Thereafter, while keeping the liquid temperature at 55±2° C., concentrated hydrochloric acid was added to adjust the pH of the liquid to 3. Next, to this liquid, 40 parts of sodium chloride was added over a period of 15 minutes, and these were stirred for 30 minutes, followed by further addition of concentrated hydrochloric acid to adjust the pH of the liquid to 2. The acidic aqueous solution obtained was stirred for 1 hour, where the crystals precipitated were collected by filtration. The crystals thus obtained were washed with 100 parts of an aqueous 20% sodium chloride solution to obtain red wet cake containing the above Exemplified Compound 1.

Step G: The wet cake obtained as above was added to 500 parts of methanol, and raising the temperature to 60 to 65° C., these were stirred for 1 hour. The crystals precipitated were collected by filtration and then washed with methanol, followed by drying to obtain the above Exemplified Compound 1 in the form of free acid. Exemplified Compound 1 in the form of free acid, thus obtained, was made into the form of sodium salt by a conventional ion-exchange process. Thus, Exemplified Compound 1 in the form sodium salt was obtained which was to be used in preparing inks.

Examples 1 to 8 and Comparative Examples 1 to 4

Preparation of Inks

The components shown in the upper column of Table 3 below were mixed and thoroughly stirred, followed by pressure filtration using a filter of 0.2 μm in pore size to prepare Inks 1 to 12 of Examples 1 to 8 and Comparative Examples 1 to 4, respectively. In the lower column of Table 3, main characteristics of inks are shown together. The surface tension of the aqueous medium refers to a value found by measuring it with an automatic surface tension meter (CBVP-Z Model, manufactured by Kyowa Interface Science Co., Ltd.) in an environment of a temperature of 25° C. and a humidity of 50%.

ing to the following criteria. The evaluation criteria on the positional deviation of satellite droplet impact are as shown below. The results of evaluation were as shown in Table 4.

(Evaluation Criteria)

A: The positional deviation of satellite droplet impact (deviation in the direction perpendicular to the primary scanning direction) was little seen.

TABLE 3

Ink Composition and Main Characteristics of Inks
(units of components shown in upper column: %)

| | Ink No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| C.I. Acid Red 52 | 5.0 | 5.0 | 5.0 | 5.0 | 5.0 | 5.0 | | | 5.0 | 5.0 | | 5.0 |
| Exemplified Compound 1 | | | | | | | 5.0 | 5.0 | | | 5.0 | |
| Glycerol | 5.0 | 5.0 | 5.0 | 5.0 | 5.0 | 5.0 | 5.0 | 10.0 | 5.0 | 5.0 | 5.0 | 5.0 |
| Bishydroxyethyl sulfone | 5.0 | 5.0 | 5.0 | 5.0 | | 5.0 | 5.0 | 10.0 | 5.0 | 5.0 | 5.0 | 5.0 |
| Ethylene urea | 10.0 | 10.0 | 10.0 | 10.0 | 10.0 | 10.0 | 10.0 | | 10.0 | 10.0 | 10.0 | 10.0 |
| 2-Pyrrolidone | | | | 5.0 | 10.0 | | | | | | | |
| Triethylene glycol monobutyl ether | | | | | | | | | | | | 1.0 |
| Alkanediol:1,2-Propanediol | | | | 6.0 | | | | | | 5.0 | 5.0 | |
| Alkanediol:1,2-Hexanediol | 1.8 | | | | | | | | 2.0 | | | |
| Alkanediol:1,3-Propanediol | | | | | 6.0 | | | | | 5.0 | 5.0 | |
| Alkanediol:1,5-Pentanediol | | 10.0 | 9.0 | | | 5.0 | 5.0 | 5.0 | | | | |
| ACETYLENE E100 (*1) | 0.6 | 0.6 | 0.6 | 0.6 | 0.6 | 0.6 | 0.6 | 0.6 | 0.6 | 0.6 | 0.6 | 0.6 |
| Ion-exchanged water | 72.6 | 64.4 | 65.4 | 63.4 | 63.4 | 69.4 | 69.4 | 69.4 | 72.4 | 64.4 | 64.4 | 73.4 |
| Main characteristics: | | | | | | | | | | | | |
| Surface tension of aqueous medium (mN/m) | 40 | 49 | 50 | 59 | 58 | 55 | 55 | 55 | 39 | 60 | 60 | 53 |
| Alkanediol contained? | Yes. | Yes. | Yes. | Yes. | Yes. | Yes. | Yes. | Yes. | Yes. | Yes. | Yes. | No. |
| Alkenadiol having hydroxyl groups at both terminals of main chain, contained? | No. | Yes. | Yes. | No | Yes. | Yes. | Yes. | Yes. | No. | Yes. | Yes. | No. |
| Alkanediol having hydroxyl groups at both terminals of main chain (total carbon atoms: 4 to 8), contained? | No. | Yes. | Yes. | No. | No. | Yes. | Yes. | Yes. | No. | No. | No. | No. |

(*1) Acetylene glycol ethylene oxide adduct (surfactant available from Kawaken Fine Chemicals Co., Ltd.)

Evaluation (1) Positional Deviation of Satellite Droplet Impact:

The inks obtained as above were each applied to PIXUS MP810 (manufactured by CANON INC.), an ink jet recording apparatus which ejects ink by the action of heat energy, the recording head of which was converted in the following way. The recording head of this recording apparatus is one having the structure shown in FIG. 7. Stated specifically, a group of nozzles constituted of nozzles of 1 pL each and nozzles of 2 pL each in ejection volume which are arranged at arrangement intervals of 21.6 μm in a staggered manner is disposed along one side of the common liquid chamber on its left side as viewed in the drawing and in such a way that the nozzles of 2 pL are nearer to the common liquid chamber, and a group of nozzles of 5 pL each in ejection volume is disposed opposite the former on the right side as viewed in the drawing, interposing the common liquid chamber between them. The recording head has a recoding density of 2,400 dpi×1,200 dpi.

Recoding environment was set to be of temperature 23° C. and relative humidity 55%. Using this ink jet recording apparatus, the ink was continuously ejected through only one nozzle of 1 pL onto a recording medium (high-grade paper for exclusive use, HR-101, available from CANON INC.) to record discontinuous straight lines, and the recorded images obtained were visually examined to make evaluation according to the following criteria. The evaluation criteria on the positional deviation of satellite droplet impact are as shown below. The results of evaluation were as shown in Table 4.

B: The positional deviation of primary-droplet and satellite droplet impact (deviation in the direction perpendicular to the primary scanning direction) was seen, but at an allowable level.

C: The positional deviation of primary-droplet and satellite droplet impact (deviation in the direction perpendicular to the primary scanning direction) was conspicuous, and at not an allowable level.

(2) Positional Deviation of Ink Droplet Impact that is Due to Changes in Ink Ejection Speed:

The inks obtained as above were each applied to the same ink jet recording apparatus as the above. Recoding environment was set to be of temperature 23° C. and relative humidity 55%. Using this ink jet recording apparatus, the ink was continuously ejected through only one nozzle of 1 pL onto a recording medium (high-grade paper for exclusive use, HR-101, available from CANON INC.) to record discontinuous straight lines, and the recorded images obtained were visually examined to make evaluation according to the following criteria. The evaluation criteria on the positional deviation of ink droplet impact that is due to changes in ink ejection speed are as shown below. The results of evaluation were as shown in Table 4.

(Evaluation Criteria)

A: The positional deviation of primary ink droplet impact was little seen.

B: The positional deviation of primary ink droplet impact was somewhat seen.

C: The positional deviation of primary ink droplet impact was conspicuous.

(3) Durability of Recording Head:

The inks obtained as above were each applied to the same ink jet recording apparatus as the above. Recoding environment was set to be of temperature 23° C. and relative humidity 55%. After application of electric pulses to the each nozzle of the recording head in a stated number of times, whether or not any nozzles came off was visually examined to make evaluation according to the following criteria. The evaluation criteria on the durability of the recording head are as shown below. The results of evaluation were as shown in Table 4.

(Evaluation Criteria)

A: Even upon $2.0 \times 10^8$ time application of electric pulses, the nozzles little came off.

B: Upon $2.0 \times 10^8$ time application of electric pulses, some nozzles came off, but at an allowable level.

C: Upon $2.0 \times 10^8$ time application of electric pulses, the nozzles came off conspicuously, and at not an allowable level.

(4) Uniformity in Color on Plain Paper:

The inks obtained as above were each applied to the same ink jet recording apparatus as the above. Recoding environment was set to be of temperature 23° C. and relative humidity 55%. Using this ink jet recording apparatus, the ink was ejected from each nozzle of the recording head and thus images were formed on recording mediums (PB PAPER GF500, available from CANON INC.) at recording duty changed from 0% to 100% at intervals of 10%. The recorded images obtained were naturally dried for 24 hours in an environment of temperature 23° C. and relative humidity 55%. The recorded images thus obtained were visually examined at their areas of images with a recording duty of 100% to make evaluation according to the following criteria. The evaluation criteria on the uniformity in color on plain paper are as shown below. The results of evaluation were as shown in Table 4.

(Evaluation Criteria)

A: Color non-uniformity was little seen, and favorable images were formed.

B: Color non-uniformity was somewhat seen, but at an allowable level.

C: Color non-uniformity was conspicuously seen, and at not an allowable level.

(5) Intermittent-Ejection Stability:

The inks obtained as above were each applied to the same ink jet recording apparatus as the above. This ink jet recording apparatus was left to stand for 5 hours in an environment of temperature 15° C. and relative humidity 10%, and thereafter, in the same environment, the ink was ejected through one nozzle of 1 pL. Further, the nozzle was kept in non-service, without ejecting the ink therethrough for 3 seconds, and thereafter the ink was again ejected through the same nozzle to record 10 vertical ruled lines at intervals of about 400 μm on recording mediums (high-grade paper for exclusive use, HR-101, available from CANON INC.). The recorded images thus obtained were visually examined to make evaluation according to the following criteria. The evaluation criteria on the intermittent-ejection stability are as shown below. The results of evaluation were as shown in Table 4.

(Evaluation Criteria)

A: The recording was normally performable even after the nozzles were in non-service for 3 seconds.

B: Recording grade somewhat lowered after the nozzles were in non-service for 3 seconds, but at an allowable level.

C: Ink non-ejection or recording disorder came about after the nozzles were in non-service for 3 seconds, and at not an allowable level.

(6) Non-Accumulativity in Intermittent Ejection:

The inks obtained as above were each applied to the same ink jet recording apparatus as the above. This ink jet recording apparatus was left to stand for 5 hours or more in an environment of temperature 15° C. and relative humidity 10%, and thereafter, in the same environment, the ink was ejected through one nozzle of 1 pL. Further, the nozzle was kept in non-service, without ejecting the ink therethrough for 3 seconds, and thereafter the ink was again ejected through the same nozzle, and such intermittent ejection was repeatedly performed ten times. Thereafter, images were recorded on recording mediums (high-grade paper for exclusive use, HR-101, available from CANON INC.). The recorded images thus obtained were visually examined at their areas of images finally recorded to make evaluation according to the following criteria. The evaluation criteria on the non-accumulativity in intermittent ejection are as shown below. The results of evaluation were as shown in Table 4.

(Evaluation Criteria)

A: Normal recording was performable even after the above intermittent ejection was repeatedly performed ten times.

B: Recording grade somewhat lowered after the above intermittent ejection was repeatedly performed ten times, but at an allowable level.

C: Ink non-ejection or recording disorder came about after the above intermittent ejection was repeatedly performed ten times, and at not an allowable level.

(7) Nozzle Clogging Recoverability:

The inks obtained as above were each applied to the same ink jet recording apparatus as the above. Thereafter, its head cleaning was operated once, and a nozzle check pattern was recorded by ejecting the ink from each nozzle of the recording head. Thereafter, the powder supply was cut by pulling out its electric cord from a socket, to thereby make the recording head stand uncapped. In this state, the ink jet recording apparatus was left to stand for 14 days in an environment of temperature 30° C. and relative humidity 10%, and thereafter left to stand for 6 hours in an environment of temperature 25° C. to make the apparatus return to stand at normal temperature. Using this ink jet recording apparatus, the same head cleaning operation and nozzle check pattern recording as the above were repeated certain times to make evaluation according to the following criteria. The evaluation criteria on the nozzle clogging recoverability are as shown below. The results of evaluation were as shown in Table 4.

(Evaluation Criteria)

A: Normal recording was performable upon recovery operation conducted once to three times.

B: Recovery operation was conducted four or more times until normal recording became performable.

TABLE 4

| | | Ink main characteristics | | Evaluation items | | | | | | |
|---|---|---|---|---|---|---|---|---|---|---|
| Ink No. | γ* | Alkanediol | (1) | (2) | (3) | (4) | (5) | (6) | (7) |
| Example: | | | | | | | | | | |
| 1 | 1 | 40 | 1,2-hexanediol | B | C | A | A | B | B | B |
| 2 | 2 | 49 | 1,5-pentanediol | A | C | A | A | B | B | B |
| 3 | 3 | 50 | 1,5-pentanediol | A | B | A | B | B | B | B |
| 4 | 4 | 59 | 1,2-propanediol | A | A | A | B | B | B | B |
| 5 | 5 | 58 | 1,3-propanediol | A | A | A | B | A | B | A |
| 6 | 6 | 55 | 1,5-pentanediol | A | A | A | B | A | A | A |
| 7 | 7 | 55 | 1,5-pentanediol | A | A | A | A | A | A | A |
| 8 | 8 | 55 | 1,5-pentanediol | A | A | A | B | B | B | B |
| Comparative Example: | | | | | | | | | | |
| 1 | 9 | 39 | 1,2-hexanediol | C | C | A | A | B | B | B |
| 2 | 10 | 60 | 1,2-propanediol 1,3-propanediol | A | A | A | C | B | B | B |

TABLE 4-continued

Evaluation Results

| | Ink main characteristics | | | Evaluation items | | | | | | |
|---|---|---|---|---|---|---|---|---|---|---|
| Ink | | | | | | | | | | |
| | No. | γ* | Alkanediol | (1) | (2) | (3) | (4) | (5) | (6) | (7) |
| 3 | 11 | 60 | 1,2-propanediol 1,3-propanediol | A | A | A | C | B | B | B |
| 4 | 12 | 53 | None. | A | A | C | B | C | B | B |

*surface tension of aqueous medium [mN/m]
Evaluation item (1): Positional deviation of satellite droplet impact
Evaluation item (2): Positional deviation of ink droplet impact that is due to changes in ink ejection speed
Evaluation item (3): Durability of recording head
Evaluation item (4): Uniformity in color on plain paper
Evaluation item (5): Intermittent-ejection stability
Evaluation item (6): Non-accumulativity in intermittent ejection
Evaluation item (7): Nozzle clogging recoverability Examples 9 and 10

Inks 6 and 7 obtained as above and BCI-7 Series Cyan Ink and Yellow Ink (trade names; both available from CANON INC.) were used in combination as shown in Table 5 below to make up an ink set. Inks 6 and 7 differ from each other only in the types of coloring materials. The inks making up the ink set obtained as above were applied to the same ink jet recording apparatus as the above. Recoding environment was set to be of temperature 23° C. and relative humidity 55%. Using this ink jet recording apparatus, the ink was ejected from each nozzle of the recording head and thus process-black images were formed on recording mediums (PB PAPER GF500, available from CANON INC.) at recording duty changed from 0% to 100% at intervals of 10%. The recorded images obtained were naturally dried for 24 hours in an environment of temperature 23° C. and relative humidity 55%. In this image formation, as to the proportion of application amount of the respective inks, the magenta, cyan and yellow inks were ejected in equal application amount. The recorded images thus obtained were visually examined to make evaluation according to the following criteria. The evaluation criteria on the uniformity in color are as shown below. The results of evaluation are shown in Table 5.

(Evaluation Criteria)

A: Color non-uniformity was little seen in the images, and favorable images were formed.

B: Color non-uniformity was somewhat seen in the images, but were images of allowable level.

TABLE 5

Constitution of Ink Set and Evaluation Results

| | Ink set constitution | | | Evaluation results Uniformity in color of |
|---|---|---|---|---|
| | Magenta ink | Cyan ink | Yellow ink | process-black images |
| Example 9 | Ink 6 | BCI-7 Cyan Ink | BCI-7 Yellow Ink | B |
| Example 10 | Ink 7 | BCI-7 Cyan Ink | BCI-7 Yellow Ink | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-118335, filed Apr. 30, 2008, which is hereby incorporated by reference herein in its entirety.

What is claimed is:

1. An ink jet ink which is to be supplied to a recording head in which the recording head comprises a common liquid chamber from which a liquid is to be fed, a plurality of pressure chambers equipped with a heat-generating part for developing pressure applied to the liquid, a plurality of individual channels through which the liquid is introduced respectively into the plurality of pressure chambers from the common liquid chamber, and a group of nozzles which communicate respectively with the pressure chambers in order to eject the liquid therefrom;

the group of nozzles being constituted of a first nozzle group including first nozzles, a second nozzle group including second nozzles having relatively longer individual channels than those of the first nozzles, and a third nozzle group including third nozzles, which first nozzles and second nozzles are alternately arranged at arrangement intervals of less than 30 μm along one of sides of the common liquid chamber and the third nozzles are arranged along the other side of the common liquid chamber;

wherein with respect to a horizontal alignment across the common liquid chamber, the third nozzles are misaligned horizontally relative to the first nozzles and are also misaligned horizontally relative to the second nozzles;

an ejection volume of the first nozzles being 2 to 7 picoliters and an ejection volume of the second nozzles being 1 to 2 picoliters, with the proviso that the ejection volume of the first nozzles is larger than the ejection volume of the second nozzles; and the ink being ejected in the direction perpendicular to the heat-generating part;

wherein the ink jet ink comprises at least an aqueous medium, a surfactant and a coloring material;

the aqueous medium consists essentially of water and at least one water-soluble organic compound containing at least one alkanediol, and the aqueous medium has a surface tension of from 40 mN/m or more to less than 60 mN/m in an environment of a temperature of 25° C. and a humidity of 50%.

2. The ink jet ink according to claim 1, wherein the aqueous medium has a surface tension of from 50 mN/m or more to less than 60 mN/m in an environment of a temperature of 25° C. and a humidity of 50%.

3. The ink jet ink according to claim 1, wherein the alkanediol is an alkanediol having hydroxyl groups at both terminals of the main chain.

4. The ink jet ink according to claim 3, wherein the alkanediol having hydroxyl groups at both terminals of the main chain has 4 to 8 carbon atoms.

5. The ink jet ink according to claim 1, wherein the coloring material is a compound represented by the following General Formula (I):

General Formula (I)

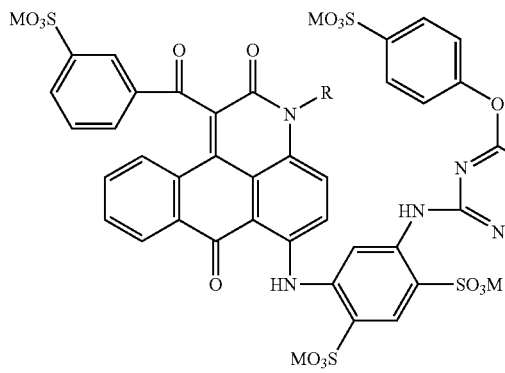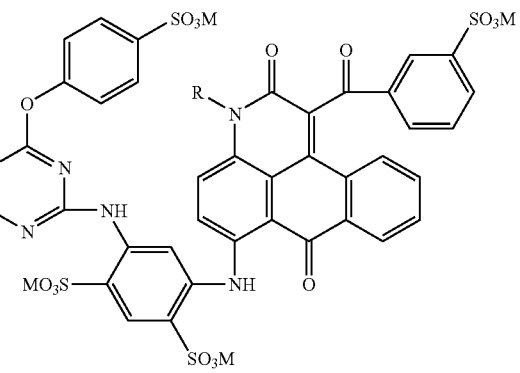

wherein R's are each independently a hydrogen atom, an alkyl group, a hydroxyalkyl group, a cyclohexyl group a monoalkylaminoalkyl group or a dialkylaminoalkyl group; M's are each independently a hydrogen atom, an alkali metal, ammonium, or an organic ammonium; and X is a linking group.

6. An ink set comprising a plurality of inks;
the ink jet ink according to claim 1 being used as any one of the inks constituting the ink set.

7. An ink jet recording method which performs recording by ejecting an ink by an ink jet system from a recording head in which the recording head comprises a common liquid chamber from which a liquid is to be fed, a plurality of pressure chambers equipped with a heat-generating part for developing pressure applied to the liquid, a plurality of individual channels through which the liquid is introduced respectively into the plurality of pressure chambers from the common liquid chamber, and a group of nozzles which communicate respectively with the pressure chambers in order to eject the liquid therefrom;

the group of nozzles being constituted of a first nozzle group including first nozzles, a second nozzle group including second nozzles having longer individual channels than those of the first nozzles, and a third nozzle group including third nozzles, which first nozzles and second nozzles are alternately arranged at arrangement intervals of less than 30 µm along one of sides of the common liquid chamber and the third nozzles are arranged along the other side of the common liquid chamber;

wherein with respect to a horizontal alignment across the common liquid chamber, the third nozzles are misaligned horizontally relative to the first nozzles and are also misaligned horizontally relative to the second nozzles;

an ejection volume of the first nozzles being 2 to 7 picoliters and an ejection volume of the second nozzles being 1 to 2 picoliters, with the proviso that the ejection volume of the first nozzles is larger than the ejection volume of the second nozzles; and the ink being ejected in the direction perpendicular to the heat-generating part;

wherein the ink comprises at least an aqueous medium, a surfactant and a coloring material;

the aqueous medium consists essentially of water and at least one water-soluble organic compound containing at least one alkanediol, and the aqueous medium has a surface tension of from 40 mN/m or more to less than 60 mN/m in an environment of a temperature of 25° C. and a humidity of 50%.

8. An ink jet recording apparatus comprising i) an ink storage portion storing an ink therein and ii) a recording head for ejecting the ink therefrom, comprising a common liquid chamber from which a liquid is to be fed, a plurality of pressure chambers equipped with a heat-generating part for developing pressure applied to the liquid, a plurality of individual channels through which the liquid is introduced respectively into the plurality of pressure chambers from the common liquid chamber, and a group of nozzles which communicate respectively with the pressure chambers in order to eject the liquid therefrom;

the group of nozzles being constituted of a first nozzle group including first nozzles, a second nozzle group including second nozzles having longer individual channels than those of the first nozzles, and a third nozzle group including third nozzles, which first nozzles and second nozzles are alternately arranged at arrangement intervals of less than 30 µm along one of sides of the common liquid chamber and the third nozzles are arranged along the other side of the common liquid chamber;

wherein with respect to a horizontal alignment across the common liquid chamber, the third nozzles are misaligned horizontally relative to the first nozzles and are also misaligned horizontally relative to the second nozzles;

an ejection volume of the first nozzles being 2 to 7 picoliters and an ejection volume of the second nozzles being 1 to 2 picoliters, with the proviso that the ejection volume of the first nozzles is larger than the ejection volume of the second nozzles; and the ink being ejected in the direction perpendicular to the heat-generating part;

wherein the ink comprises at least an aqueous medium, a surfactant and a coloring material;

the aqueous medium consists essentially of water and at least one water-soluble organic compound containing at least one alkanediol, and the aqueous medium has a surface tension of from 40 mN/m or more to less than 60 mN/m in an environment of a temperature of 25° C. and a humidity of 50%.

9. The ink jet ink according to claim 1, wherein the ink jet ink further comprises an ethylene urea.

10. The ink jet recording method according to claim 7, wherein the aqueous medium has a surface tension of from 50 mN/m or more to less than 60 mN/m in an environment of a temperature of 25° C. and a humidity of 50%.

11. The ink jet recording method according to claim 7, wherein the alkanediol is an alkanediol having hydroxyl groups at both terminals of the main chain.

12. The ink jet recording method according to claim 11, wherein the alkanediol having hydroxyl groups at both terminals of the main chain has 4 to 8 carbon atoms.

13. The ink jet recording method according to claim 7, wherein the coloring material is a compound represented by the following General Formula (I):

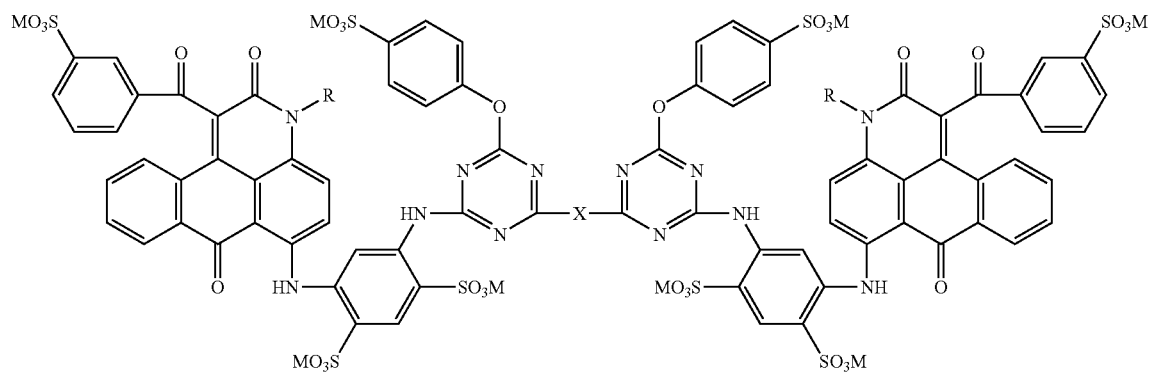

General Formula (I)

wherein R's are each independently a hydrogen atom, an alkyl group, a hydroxyalkyl group, a cyclohexyl group a monoalkylaminoalkyl group or a dialkylaminoalkyl group; M's are each independently a hydrogen atom, an alkali metal, ammonium, or an organic ammonium; and X is a linking group.

14. The ink jet recording method according to claim 7, wherein an ink set comprising a plurality of inks including the ink jet ink according to claim 7 being used as any one of the inks constituting the ink set.

15. The ink jet recording method according to claim 7, wherein the ink jet ink further comprises an ethylene urea.

* * * * *